United States Patent
Thomas et al.

(10) Patent No.: US 9,530,108 B2
(45) Date of Patent: *Dec. 27, 2016

(54) SYSTEM AND METHODS FOR MAPPING PRICE AND LOCATION OF TICKETS IN AN EVENT VENUE

(71) Applicant: STUBHUB, INC., San Francisco, CA (US)

(72) Inventors: Eric Thomas, San Francisco, CA (US); Ganesh Ramamurthy, Redwood City, CA (US); Benjamin Salles, San Mateo, CA (US); Mihir Sambhus, Milpitas, CA (US); David Han, San Francisco, CA (US)

(73) Assignee: STUBHUB, INC., San Francisco, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 13/778,023

(22) Filed: Feb. 26, 2013

(65) Prior Publication Data

US 2013/0173319 A1  Jul. 4, 2013

Related U.S. Application Data

(63) Continuation of application No. 13/221,560, filed on Aug. 30, 2011, now Pat. No. 8,386,334, which is a
(Continued)

(51) Int. Cl.
*G06Q 30/00* (2012.01)
*G06Q 10/02* (2012.01)
*G06Q 30/06* (2012.01)

(52) U.S. Cl.
CPC ......... *G06Q 10/02* (2013.01); *G06Q 30/0601* (2013.01); *G06Q 30/0623* (2013.01);
(Continued)

(58) Field of Classification Search
CPC .......................................... G06Q 30/00–30/08
(Continued)

(56) References Cited

U.S. PATENT DOCUMENTS 5,408,417 A  4/1995 Wilder
5,797,126 A  8/1998 Helbling et al.
(Continued)

FOREIGN PATENT DOCUMENTS

WO    WO 02/25557    3/2002

OTHER PUBLICATIONS

McLennan, Scott, "The scramble for the best seat in the house", Telegram & Gazette, Apr. 27, 2003, pp. 3, Worcester, Massachusetts.
(Continued)

*Primary Examiner* — Michael Misiaszek
(74) *Attorney, Agent, or Firm* — Haynes and Boone, LLP

(57) ABSTRACT

A system and methods for mapping price and location of tickets in an event venue are described. An interactive event venue seat map is provided by a network-based system that implements an online marketplace for tickets for upcoming events. The interactive event venue seat map enables sellers to view pricing information and transaction information for both sold and current event listings for any section or zone in an event venue. The interactive event venue seat map allows sellers to browse and click on sections to see sold and listed data for any section and zone in the event venue and to compare a proposed sale price to available pricing information of sold and current event listings in comparable sections. Other embodiments are described and claimed.

21 Claims, 6 Drawing Sheets

Related U.S. Application Data continuation of application No. 12/544,615, filed on Aug. 20, 2009, now Pat. No. 8,024,234, which is a continuation-in-part of application No. 11/552,782, filed on Oct. 25, 2006, now Pat. No. 7,917,398.

(52) U.S. Cl.
 CPC ..... *G06Q 30/0625* (2013.01); *G06Q 30/0627* (2013.01); *G06Q 30/0639* (2013.01); *G06Q 30/0641* (2013.01); *G06Q 30/0643* (2013.01)

(58) Field of Classification Search
 USPC ................................................. 705/26.1–27.2
 See application file for complete search history.

(56) References Cited

U.S. PATENT DOCUMENTS

| | | | |
|---|---|---|---|
| 6,023,685 A | 2/2000 | Brett et al. | |
| 6,107,932 A | 8/2000 | Walker et al. | |
| 6,223,166 B1 | 4/2001 | Kay | |
| 6,240,396 B1 | 5/2001 | Walker et al. | |
| 6,457,046 B1 | 9/2002 | Munakata | |
| 6,704,713 B1 | 3/2004 | Brett | |
| 6,907,405 B2 | 6/2005 | Brett | |
| 6,999,936 B2 | 2/2006 | Sehr | |
| 7,003,485 B1 | 2/2006 | Young | |
| 7,044,362 B2 | 5/2006 | Yu | |
| 7,454,361 B1 | 11/2008 | Halavais et al. | |
| 7,506,805 B1 | 3/2009 | Chakravarthy | |
| 7,584,123 B1 | 9/2009 | Karonis et al. | |
| 2002/0052758 A1 | 5/2002 | Arthur et al. | |
| 2002/0082879 A1* | 6/2002 | Miller et al. ................ | 705/5 |
| 2002/0116121 A1 | 8/2002 | Ruiz et al. | |
| 2003/0061147 A1 | 3/2003 | Fluhr et al. | |
| 2003/0164400 A1 | 9/2003 | Boyd | |
| 2003/0236736 A1 | 12/2003 | Harmon et al. | |
| 2004/0006497 A1 | 1/2004 | Nestor et al. | |
| 2004/0039696 A1 | 2/2004 | Harmon et al. | |
| 2004/0093302 A1 | 5/2004 | Baker et al. | |
| 2005/0131659 A1 | 6/2005 | Mei et al. | |
| 2005/0144115 A1 | 6/2005 | Brett | |
| 2006/0081704 A1 | 4/2006 | Boyd | |
| 2006/0143094 A1 | 6/2006 | Kohout et al. | |
| 2007/0027794 A1 | 2/2007 | Brett | |
| 2007/0027798 A1 | 2/2007 | Brett | |
| 2007/0033131 A1 | 2/2007 | Brett | |
| 2007/0038582 A1 | 2/2007 | Brett | |
| 2007/0055554 A1 | 3/2007 | Sussman et al. | |
| 2007/0265892 A1* | 11/2007 | Valentino ................ | 705/5 |
| 2008/0103934 A1 | 5/2008 | Gibson et al. | |
| 2008/0195580 A1 | 8/2008 | Knuetter et al. | |
| 2008/0229225 A1 | 9/2008 | Kaye | |
| 2008/0235110 A1 | 9/2008 | Carter et al. | |
| 2008/0255889 A1 | 10/2008 | Geisler et al. | |
| 2008/0281644 A1 | 11/2008 | Payne | |
| 2008/0300925 A1 | 12/2008 | Benson et al. | |
| 2009/0030748 A1 | 1/2009 | Halavais et al. | |
| 2009/0063206 A1 | 3/2009 | Payne et al. | |
| 2009/0083085 A1 | 3/2009 | Halavais et al. | |
| 2010/0113072 A1 | 5/2010 | Gibson et al. | |
| 2010/0131366 A1 | 5/2010 | Gibson et al. | |
| 2010/0131530 A1 | 5/2010 | Gibson et al. | |
| 2010/0133339 A1 | 6/2010 | Gibson et al. | |
| 2010/0169130 A1 | 7/2010 | Fineman et al. | |
| 2010/0257002 A1* | 10/2010 | Brett ................ | 705/5 |

OTHER PUBLICATIONS

Ticketsnow, TicketsNow Interactive Seating Charts Help Fans Find and Buy World Series Tickets, PR Newswire, Oct. 19, 2006.
"ElectroTix Offers New Visual Approach to Selling Tickets on Internet." Business editors/Computer Writers, Business Wire, New York: May 28, 1998. p. 1, http://www.thefreelibrary.com/ElectroTix+Offers+New+Visual+Approach+to+Selling+Tickets+On+Internet.-a050038434.
https://www.seats3d.com/ dated Feb. 22, 2007.
http://www.seats.com/ dated Feb. 22, 2007.
http://www.tickco.com/ dated Feb. 22, 2007.
http://www.tickets4U.com/ dated Feb. 22, 2007.
http://www.ticketsnow.com/ dated Feb. 22, 2007.

* cited by examiner

Home > Sell Tickets >
Get Started    Seating    Payment    Place Listing

Payment Method and Pricing

Important. When setting your per-ticket price, don't forget to consider StubHub's 15% commission which will be automatically deducted from your payment when your tickets sell.

We process your payment 7 days after buyers receive their tickets.                                    Help Choose a per-ticket price and sale end date for your tickets.

Los Angeles Dodgers at San Francisco Giants
AT&T Park 07/04/2008 Friday 5:00PM – Section 317 Row JJ Price per ticket:
US$ [155]   [Compare Prices]   What's This?
      302    304

Sale End Date:
[07/01/2008 ▽]   What's This?

Help

How would you like to be paid when your tickets sell?

◉ Pay me via PayPal (PayPal waives transaction fees for StubHub sellers)
○ Pay me via check by U.S. Mail
○ Donate my payment to charity and receive a tax-deduction:

[– Select Charity – ▽]

[◁ Back]                                                              [Continue ▷]

Need Help?

Contact A Service Rep

Getting Paid by Check

Checks will be made out and sent to the name and address in your payment settings in *My Account*.

Getting Paid Through PayPal

If you don't have a PayPal account just yet, please use the same email address you provided StubHub. After your tickets sell you'll receive instructions on how to create a PayPal account and pick up your payment at the email address you provided us.

If you already have a PayPal account and wish to receive payments at that email address, please list your tickets for sale at StubHub with an account that uses that same address.

Using Pricing Data

Pricing data is provided for historic sales of similar sections where possible. If similar sections have not sold recently, the last five sales for the event will be listed.

| Event | Event Date | End Date | Section | Row | Sent Quantity | Sale Method | Price | Posted On | Action |
|---|---|---|---|---|---|---|---|---|---|
| | | | | | | | | | Edit |
| ☐ Chicago Cubs At San Francisco Giants Tickets | 2008-06-30 Monday 7:15 PM | 2008-06-25 Wednesday 10:00AM (PDT) | 330 | 11 | 1-2 2 ticket(s) | Fixed Price | $ 755.00 each ▾ | StubHub | Edit |
| ☐ Chicago Cubs At San Francisco Giants Tickets | 2008-07-01 Tuesday 7:15 PM | 2008-06-26 Thursday 10:00AM (PDT) | 330 | 11 | 1-2 2 ticket(s) | Fixed Price | $ 755.00 each ▾ | StubHub | Edit |
| ☐ Chicago Cubs At San Francisco Giants Tickets | 2008-07-02 Wednesday 7:15 PM | 2008-06-27 Friday 10:00AM (PDT) | 330 | 11 | 1-2 2 ticket(s) | Fixed Price | $ 755.00 each ▾ | StubHub | Edit |

Save Your Price

600

```
┌─────────────────────────────────────────┐
│ Providing One or More User Interfaces for│
│   Creating an Event Listing for a Seller │
│                   610                    │
└─────────────────────────────────────────┘
                    │
┌─────────────────────────────────────────┐
│    Receiving Ticket Details from the Seller│
│                   620                    │
└─────────────────────────────────────────┘
                    │
┌─────────────────────────────────────────┐
│ Obtaining Available Pricing Information for the│
│  Event based on Sold Prices and Listed Prices│
│                   630                    │
└─────────────────────────────────────────┘
                    │
┌─────────────────────────────────────────┐
│ Providing a User Interface for Presenting an│
│     Interactive Event Venue Seat Map to  │
│   Display Available Pricing Information for a│
│      Section of the Seller Based on      │
│     the Sold Prices and the Listed Prices│
│                   640                    │
└─────────────────────────────────────────┘
```

*FIG. 6*

SYSTEM AND METHODS FOR MAPPING PRICE AND LOCATION OF TICKETS IN AN EVENT VENUE

CROSS REFERENCE TO RELATED APPLICATIONS

This application is a continuation of U.S. patent application Ser. No. 13/221,560, filed Aug. 30, 2011 and is a continuation of U.S. patent application Ser. No. 12/544,615, filed on Aug. 20, 2009, which has a U.S. Pat. No. 8,024,234, which is a continuation-in-part application of U.S. patent application Ser. No. 11/552,782, filed Oct. 25, 2006, which has a U.S. Pat. No. 7,917,398, which are incorporated by reference in their entirety.

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. For these reasons, sellers actively use the Internet to offer, sell and distribute a wide variety of goods to take advantage of the many benefits provided by the Internet and electronic commerce.

One example of a market for goods within the realm of electronic commerce is the online ticket market. StubHub provides a network-based system which implements an online ticket marketplace for buyers and sellers of tickets for live events such as sports, concerts, theater, and other entertainment events. The StubHub online ticket marketplace enables legitimate, convenient, reliable, and secure transactions at fair market value and provides ticket fulfillment services, even for "sold out" events. Accordingly, the StubHub online ticket marketplace provides benefits for fans who wish to buy, sell or otherwise transfer tickets as well as for teams, artists, and venues.

SUMMARY

A system and methods for mapping price and location of tickets in an event venue are described. In general, an interactive event venue seat map is provided by a network-based system to make ticket transactions more efficient and cost-effective for sellers and buyers in an online marketplace for tickets for upcoming events. The listing process for sellers includes a price mapping feature that introduces sold ticket data in a uniformly displayed interactive event venue seat map for enabling sellers to view both sold and current listing data for any section or zone in an event venue. The listing process for sellers also provides a "lookahead" section filter when the seller enters section information for an event with an interactive event venue seat map. As the seller types in ticket information for a listing, the "section" field is read as the seller types, and relevant sections are suggested for the seller to choose. This not only makes typing for the seller easier, but also reduces the number of listings that go unmapped and therefore unsold.

The interactive event venue seat map allows sellers to browse and click on sections to see sold and listed data for any section in the event venue. The interactive event venue seat map also provides a zone view that allows sellers to click on any zone in the legend to see all sold and listed data for that zone. The interactive event venue seat map further includes a "compare" feature for providing sellers with a quick visual indication whether a proposed sale price is within a sale price range determined from sold and current listing data of other similar listings. For example, the interactive event venue seat map compares and shows sections where the average sold price is close to the price that the seller is considering which helps the seller pinpoint sections to look at in more detail.

Sellers with active event listings also can access the interactive event venue seat map at any time via their "my active ticket listings" page in their accounts. A "compare prices" icon is presented for each active event listing that, when clicked, displays an interactive event venue seat map for that listing to allow the seller to keep abreast of pricing trends for their event and make necessary pricing adjustments as needed.

Sellers with active event listings also may receive transactional e-mail messages that complement and drive sellers to the interactive event venue seat map. The transactional e-mail messages inform sellers that their tickets are still listed and that the event date is approaching and also provide a link to the online ticket marketplace and/or an interactive event venue seat map for the event to allow sellers to view the most recent pricing data.

The interactive event venue seat map provides sellers with the opportunity to view pricing details to allow for a more accurate picture of the current market value of their tickets. Displaying sold ticket prices serves as a highly valuable gauge for sellers, arming them with insight on the actual prices fans have been willing to pay for specific locations. Accordingly, sellers are better able to price their tickets based on the truest market value, resulting in a quicker sale. The interactive event venue seat map helps both the occasional seller, who wants to make a quick pricing decision, as well as the more frequent seller, who wants to research trends and listing data to ensure their tickets are listed with a price that makes them likely to be purchased.

By providing sellers with sold and current listing data in an interactive event venue seat map, listings of more tickets to a greater number of events are created at the most competitive and attractive prices possible. Buyers benefit from having a greater selection of tickets priced at a true market-value. As such, marketplace efficiencies are improved with respect to selling and buying processes by more efficiently connecting buyers and sellers making it easier and more convenient for fans to exchange tickets to events nationwide. Various embodiments are described and claimed.

BRIEF DESCRIPTION OF THE DRAWINGS

FIGS. 2-5 illustrate representations of user interfaces displayed on a computer for providing online marketplace and ticket fulfillment services in accordance with various embodiments.

FIG. 6 illustrates a logic flow including operations performed by a computer to provide online marketplace and ticket fulfillment services in accordance with various embodiments.

The foregoing aspects and many of the attendant advantages of various embodiments will become more readily appreciated and better understood by reference to the following detailed description and the accompanying drawings.

DETAILED DESCRIPTION

Various embodiments are described for mapping price and location of tickets in an event venue. Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
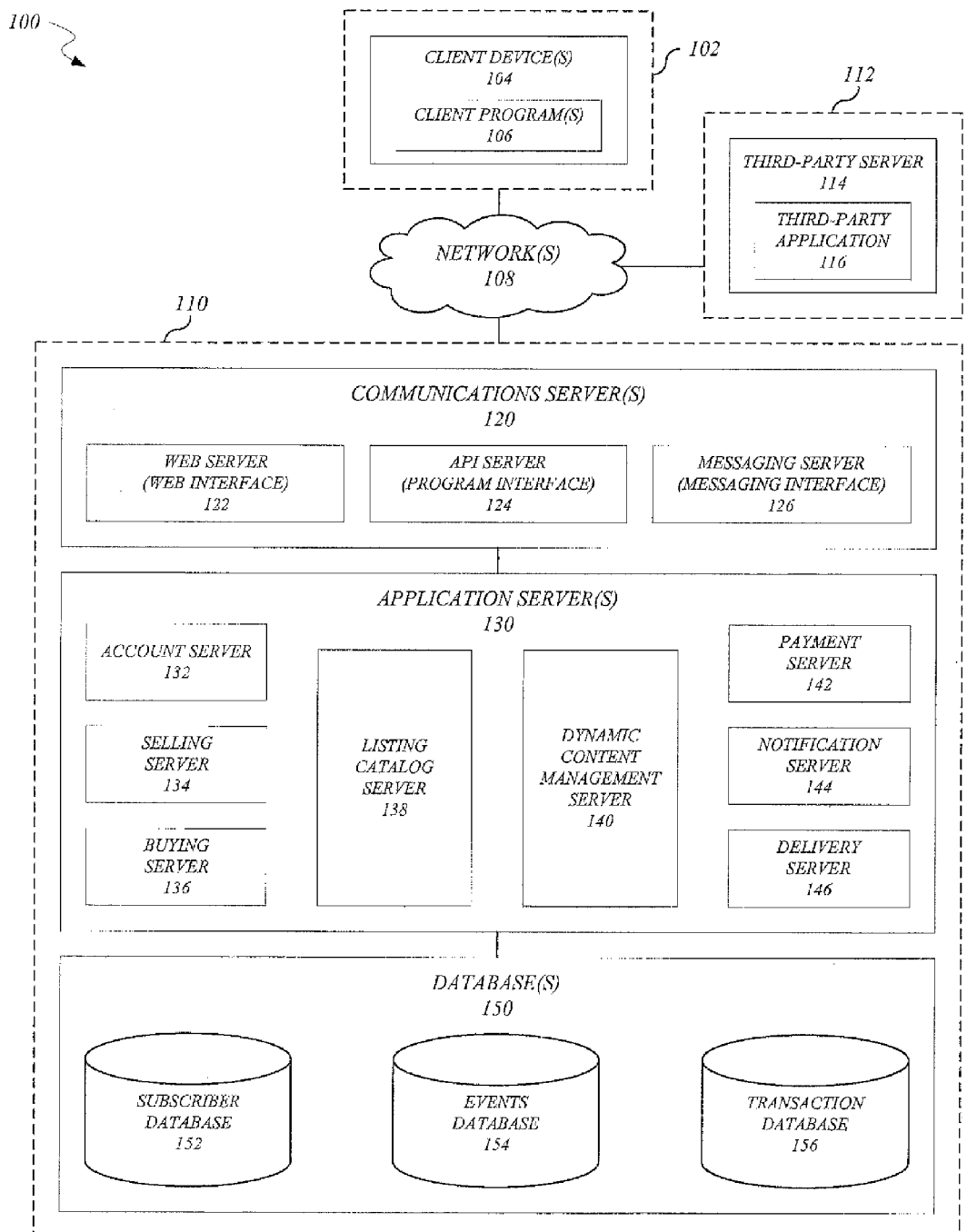
FIG. 1 illustrates an exemplary communications system including a network-based system for providing online marketplace and ticket fulfillment services in accordance with various embodiments.

FIG. 1 illustrates a communications system 100 suitable for implementing various embodiments. The elements of the communications system 100 generally may comprise physical or logical entities for communicating information and, in some cases, may be implemented as hardware, software, or combination thereof, as desired for a given set of design parameters or performance constraints. Although FIG. 1 includes a limited number of elements for purposes of illustration, it can be appreciated that the communications system 100 may include more or less elements as well as other types of elements.

Various elements of the communications system 100 may be implemented utilizing one or more computing devices having computing and/or communications capabilities in accordance with the described embodiments. Exemplary computing devices may include, without limitation, a mobile device, a personal digital assistant (PDA), a mobile computing device, a communications device, a telephone, a mobile telephone, a cellular telephone, a smart phone, a handset, a one-way pager, a two-way pager, a messaging device, a computer, a personal computer (PC), a desktop computer, a work station, a laptop computer, a notebook computer, a tablet computer, a handheld computer, a minicomputer, a network appliance, a web appliance, a server, a server computer, a server array, a server farm, an Internet server, a web server, a network server, a main frame computer, a supercomputer, a distributed computing system, multiprocessor system, processor-based systems, a control system, consumer electronic equipment, a media device, a gaming device, a television, a digital television, a set-top box (STB), wireless access point, base station, subscriber station, mobile subscriber center, radio network controller, a network access device, a telephone network device, a mobile telephone network device, a VoIP network device, a radio network device, a television network device, a satellite network device, a router, a hub, a gateway, a bridge, a switch, a machine, or combination thereof.

The computing devices utilized by the communications system 100 may be implemented by various hardware and/or software components in accordance with the described embodiments. Exemplary hardware components may include processing devices such as central processing unit (CPU) and/or other processors, microprocessors, application processors, radio processors, baseband processors, digital signal processors (DSP), circuits, circuit elements (e.g., transistors, resistors, capacitors, inductors, and so forth), integrated circuits, application specific integrated circuits (ASIC), programmable logic devices (PLD), a field programmable gate array (FPGA), logic gates, registers, semiconductor device, chips, microchips, chip sets, memory such as volatile and/or non-volatile memory, a display such as a liquid crystal display (LCD) or cathode ray tube (CRT), input devices such a keyboard, mouse, stylus, touch pad, and/or touch screen, networking devices such as ports, network interface cards (NICs), transmitters, receivers, transceivers, and/or antennas, as well as other components. Exemplary software components may include computer programs, applications, application programs, system programs, operating system (OS) software, middleware, firmware, a software interface, a programmatic interface, an application program interfaces (API), a network interface, a web interface, a messaging interface, modules, instruction sets, routines, subroutines, functions, calls, computing code, or combination thereof.

Various elements of the communications system 100 may support wired and/or wireless communications functionality in accordance with the described embodiments. For example, some computing devices may be arranged to communicate information over one or more types of communication links such as a wire, cable, bus, printed circuit board (PCB), backplane, switch fabric, semiconductor material, twisted-pair wire, co-axial cable, fiber optic connection, Ethernet connection, peer-to-peer (P2P) connection, a data channel, a radio channel, a satellite channel, a television channel, a broadcast channel, an infrared (IR) channel, a radio-frequency (RF) channel, a portion of the RF spectrum, one or more licensed or license-free frequency bands, and so forth.

Various elements of the communications system 100 may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/1×RTT, GSM/GPRS, EDGE, HSDPA, HSUPA, and others.

Computing devices and networks may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electro-magnetic induction (EMI) communication, passive or active RFID communication, micro-impulse radar (MIR), ultra-wide band (UWB) communication, automatic identification and data capture (AIDC) communication, and others.

Further aspects and advantages of various embodiments will become more readily appreciated and better understood by the following description of the elements of the communications system 100 illustrated in FIG. 1. Although certain exemplary embodiments and implementations may be illustrated and described as comprising a particular combination of elements and performing a particular set of operations, it is to be understood that the principles and techniques discussed herein are not limited to such examples.

In the embodiment shown in FIG. 1, the communications system 100 includes, among other elements, a client 102 which may comprise or employ one or more client devices 104 such as a mobile computing device, a PC, and/or any other computing device having computing and/or communications capabilities in accordance with the described embodiments. The client devices 104 generally may provide one or more client programs 106 such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. In some usage scenarios, one or more of the client programs 106 may display various graphical user interfaces (GUIs) to present information to and/or receive information from one or more of the client devices 104.

As shown, the client 102 is communicatively coupled via one or more networks 108 to a network-based system 110. The network-based system 110 may be structured, arranged, and/or configured to allow the client 102 to establish one or more communications sessions with the network-based system 110 using various computing devices 104 and/or client programs 106. Accordingly, a communications session between the client 102 and the network-based system 110 may involve the unidirectional and/or bidirectional exchange of information and may occur over one or more types of networks 108 depending on the mode of communication. While the embodiment of FIG. 1 illustrates the communications system 100 deployed in a client-server operating environment, it is to be understood that other suitable operating environments and/or architectures may be used in accordance with the described embodiments.

Data and/or voice communications between the client 102 and the network-based system 110 may be sent and received over one or more networks 108 such as the Internet, a WAN, a WWAN, a WLAN, a mobile telephone network, a landline telephone network, a VoIP network, as well as other suitable networks. For example, the client 102 may communicate with the network-based system 110 over the Internet or other suitable WAN by sending and or receiving information via interaction with a web site, e-mail, IM session, and/or video messaging session. The client 102 also may communicate with the network-based system 110 via a telephone call to a customer service agent and/or interactive voice response (IVR) system made over a mobile telephone network, a landline network, and/or a VoIP network. In wireless implementations, the client 102 may communicate with the network-based system 110 over the Internet via a WLAN or mobile telephone network that supports WWAN communications services. The client 102 also may communicate over a mobile telephone network via SMS and/or MMS messaging. It is to be appreciated that the embodiments are not limited in this regard.

In various usage scenarios, communication sessions and/or messaging between the client 102 and the network-based system 110 may involve multiple modes of communication and/or multiple networks. In some cases, for example, the client 102 may initiate communication with the network-based system 110 by interacting with a web site. In response, the network-based system 110 may communicate with the client 102 in a variety of ways such as via the web site, e-mail, IM, SMS, MMS, and/or a telephone call from a customer service agent and/or IVR system. The communication from the network-based system 110 may comprise a message (e.g., e-mail, IM, SMS, MMS) containing relevant static or dynamic content, an embedded hyperlinked URL for directing the client 102 to a web site, and/or a hyperlinked telephone number for allowing the client 102 to click and place a telephone call to an agent (e.g., customer service agent and/or IVR system) of the network-based system 110.

When communicating with the network-based system 110, the client 102 may employ one or more client devices 104 and/or client programs 106. In various implementations, the client devices 104 and/or client programs 106 may host or provide one or more interfaces for communicating with the network-based system 110. Exemplary interfaces may include a web interface, an API interface, a messaging interface, and/or other suitable communication interface in accordance with the described embodiments. The client programs 106 for communicating with the network-based system 110 may comprise, for example, pre-installed, authored, downloaded, and/or web-based computer programs.

The client programs 106 provided by one or more of the client devices 104 (e.g., mobile computing device and/or PC) may include a web client. The web client may comprise, for example, a desktop and/or mobile (e.g., WAP) web browser (e.g., Internet Explorer®, Mozilla®, Firefox®, Safari®, Opera®, Netscape Navigator®, etc.) capable of rendering web pages (e.g., HTML documents) and supporting various browser-based web technologies and programming languages such as HTML, XHTML, CSS, Document Object Model (DOM), XML, XSLT, XMLHttpRequestObject, JavaScript, ECMAScript, Jscript, Ajax, Flash®, Silverlight™, Visual Basic® (VB), VB Scripting Edition (VBScript), PHP, ASP, Java®, Shockwave®, Python, Perl®, C#/.net, and/or others.

In various usage scenarios, the client 102 may use a web client to provide an interface (e.g., HTTP interface) for navigating to a web site associated with the network-based system 110 and for requesting and receiving web page data from the network-based system 110. For example, the client 102 may use the web client to navigate to a web site associated with the network-based system 110 by entering a URL into a web browser address bar and/or by clicking on a hyperlinked URL delivered to the client 102 via a web page, web-based application, e-mail, IM, SMS, MMS, and/or other delivery mechanism.

In one or more embodiments, the web client may comprise or be implemented as a web browser toolbar for communicating with the network-based system 110. In such embodiments, the web browser toolbar may include, for example, a button (e.g., dedicated, customized, add-on) and/or a hyperlinked URL for navigating to a web site associated with the network-based system 110. The web browser toolbar also may implement enhanced features such as a search engine interface (e.g., text entry box, input fields, checkboxes, clickable hyperlinks) and/or one or more pull-down menus for accessing the network-based system 110, sending information (e.g., search query, keywords, user preferences, menu selections) to the network-based system 110, and/or receiving information (e.g., search results, relevant static or dynamic content) from the network-based system 110.

In one or more embodiments, the web client may comprise or be implemented as a widget such as a desktop or mobile widget for communicating with the network-based system 110. In such embodiments, the desktop or mobile widget may comprise web-based code, an interpreter, a virtual machine, and/or an API implementation to request, receive, present, and/or update content hosted by the network-based system 110. The desktop or mobile widget may comprise, for example, a client-side web application displayed on the desktop or phone-top of one or more of the client devices 104 implemented using various web technologies and programming languages. In various implementations, the desktop or mobile widget may be supported by a host runtime environment such as a web browser or suitable rendering engine and/or may be installed and run as a stand-alone application outside of a web browser.

In various embodiments, the network-based system 110 may provide users with one or more client-side web applications as described in co-pending U.S. patent application Ser. No. 12/262,468 titled "System and Methods for Providing Location-Based Upcoming Event Information Using a Client-Side Web Application Implemented on a Client Device," which was filed on Nov. 31, 2008 and is incorporated by reference in its entirety. In such embodiments, once downloaded and installed on a client device (e.g., PC or mobile device) of the user, the client-side web application may be configured to provide upcoming event information based upon the location of the user.

As shown in FIG. 1, the communications system 100 includes, among other elements, a third party 112 which may comprise or employ a third-party server 114 hosting a third-party application 116. In various implementations, the third-party server 114 and/or third-party application 116 may host a web site associated with or employed by a third party 112 such as an affiliate, partner, or other third-party entity or user in accordance with the described embodiments. It can be appreciated that, in some implementations, the third party 112 may provide the third-party application 116 for promoting, enhancing, complementing, supplementing, and/or substituting for one more services provided by the network-based system 110. For example, the third-party server 114 and/or third-party application 116 may enable the network-based system 110 to provide the client 102 with additional services and/or information such as additional ticket inventory.

In some usage scenarios, one or more of the client programs 106 may be used to access the network-based system 110 via the third party 112. For example, the client 102 may use a web client to access and/or receive content from the network-based system 110 after initially communicating with a third-party web site. The web site of the third party 112 (e.g., affiliate, partner) may comprise, for example, a hyperlinked advertisement, a web widget, and/or an API implementation comprising web-based code within a web page to present static or dynamic content hosted by the network-based system 110 and/or to provide programmatic access to the network-based system 110.

It can be appreciated that the hyperlinked advertisement, web widget, and/or API implementation for communicating with the network-based system 110 may be hosted by various third-party web sites such as an affiliate web site, a partner web site, an online marketplace web site, an entertainment web site, a sports web site, a media web site, a search engine web site, a social networking web site, a blog, and/or any other corporate or personal web site or web page in accordance with the described embodiments. In some cases, the third party 112 may be directly or indirectly compensated for directing traffic from the third-party web site to the web site of the network-based system 110 and/or in the event that an electronic commerce transaction results after a user is directed from the third-party web sites to the web site of the network-based system 110.

In various embodiments, the web client and/or the network-based system 110 may provide the user with the ability to receive and aggregate content and/or online marketplace and ticket fulfillment services of the network-based system 110 and other third-party services (eBay® services, Kijiji™ services, PayPal™ services, etc.). For example, the web client may display location-based upcoming event information that includes event listings published by sellers via the online marketplace services of the network-based system 110 as well as event listings published by sellers via one or more third-party online marketplace services (e.g., eBay® services, Kijiji™ services). In such embodiments, the client-side web application may display an aggregate of ticket inventory available from multiple online marketplaces providing the user with multiple purchasing options.

The client programs 106 executed by one or more of the client devices 104 may include a programmatic client for accessing and communicating with the network-based system 110. Along with performing a certain set of functions, the programmatic client may include, for example, an implementation of an API provided by the network-based system 110 for enabling access to and/or communication with various elements (e.g., servers, databases) of the network-based system 110. In various embodiments, the API implementation may comprise executable code in accordance with an SDK provided by the network-based system 110.

In some usage scenarios, the programmatic client may be implemented as a stand-alone or web-based database, point-of-sale (PUS), and/or inventory management application for managing a large volume of available inventory and communicating with the network-based system 110. The programmatic client may be employed, for example, by high-volume sellers to author, update, and manage a large number of inventory listings. In some cases, a high-volume seller may use the programmatic client to perform batch-mode communication with the network-based system 110. The batch-mode communication from the high-volume seller may comprise data for numerous inventory items (e.g., hundreds, thousands) for publication by the network-based system 110. The programmatic client also may be used to communicate with the network-based systems in real-time. For example, communications from the high-volume seller may comprise real-time inventory updates so that the listings published by the network-based system 110 accurately reflect the available inventory of the high-volume seller.

The client programs 106 executed by one or more of the client devices 104 (e.g., mobile computing device and/or PC) also may include a messaging client. The messaging client may comprise, for example, an application that supports one or more modes of communication such as e-mail, IM, SMS, MMS, telephone, VoIP, video messaging, and so forth. It can be appreciated that some messaging clients may required and/or launch an Internet connection in the background when executed.

In accordance with various embodiments, the network-based system 110 may communicate with and provide services to users such as buyers and/or sellers of goods such as event tickets. For example, the network-based system 110 may comprise or implement an online ticket marketplace for buyers and sellers of tickets for live events such as sports, concerts, theater, and other entertainment events.

It is to be appreciated that goods for purchase and/or sale may include both tangible goods (e.g., physical tickets, electronic tickets), intangible goods (e.g., rights and/or licenses that are afforded by the tickets), and other goods in accordance with the described embodiments. It also is to be appreciated that users other than buyers and/or sellers may communicate with the network-based system 110. In some cases, for example, the client 102 may be associated with an administrator or customer service agent and may communicate with the network-based system 110 to monitor, update, and/or otherwise manage one or more computing devices and/or services of the network-based system 110.

FIG. 1 illustrates an exemplary embodiment of the network-based system 110 for providing online ticket marketplace. As shown, the network-based system 110 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers.

In various implementations, the servers of the network-based system 110 may comprise or implement software components deployed in a tiered environment, where one or more servers are used to host server software running in each tier. For example, using a three-tiered architecture, one or more server software components may be hosted by front-end servers, one more server software components may be hosted by a middle tier or middleware implemented by application servers, and one more server software components may be hosted by a back-end tier implemented by databases and/or file systems. In some embodiments, servers of the network-based system 110 may be communicatively coupled with each other via a local area network (LAN) and/or suitable intranet or back-end network.

The network-based system 110 may comprise one or more communications servers 120 for providing suitable interfaces to enable communication using various modes of communication and/or via one or more networks 108. In the embodiment of FIG. 1, the communications servers 112 include a web server 122, an API server 124, and a messaging server 126 to provide interfaces to one or more application servers 130. The application servers 130 of the network-based system 110 may be structured, arranged, and/or configured to provide various online marketplace and/or ticket fulfillment services to users that access the network-based system 110.

In various usage scenarios, the client 102 may communicate with the applications servers 130 of the network-based system 110 via one or more of a web interface provided by the web server 122, a programmatic interface provided by the API server 124, and a messaging interface provided by the messaging server 126. It can be appreciated that the web server 122, the API server 124, and the messaging server 126 may be structured, arranged, and/or configured to communicate with various types of client devices 104 and/or client programs 106 and may interoperate with each other in some implementations.

The web server 122 may be arranged to host web pages (e.g., HTML documents) and provide an appropriate web interface (e.g., HTTP, CGI, etc.) for enabling data to be presented to and received from entities via the Internet. The web server 122 may be arranged to communicate with web clients and/or applications such as a web browser, web browser toolbar, desktop widget, mobile widget, web-based application, web-based interpreter, virtual machine, and so forth. The web server 122 may provide a web interface to enable access by the client 102 and/or the third party 112 to the various services and functions provided by the application servers 130. For example, the web server 122 may be arranged to receive data from the client 102 and/or third party 112 and to pass the data to one or more application servers 130 within the network-based system 110. The web server 122 also may present the client 102 and/or third party 112 with relevant static and dynamic content hosted by the network-based system 110 in response to various requests and/or events.

The API server 124 may be arranged to communicate with various client programs 106 and/or a third-party application 116 (e.g., third-party web site) comprising an implementation of API for the network-based system 110. The API server 124 may provide a programmatic interface to enable access by the client 102 and/or the third party 112 to the various services and functions provided by the application servers 130. For example, the programmatic interface provided by the API server 124 may be used for batch-mode and/or real-time communication with a high-volume seller for receiving and updating inventory listings. The programmatic interface provided by the API server 124 also may be used to communicate relevant static or dynamic content hosted by the network-based system 110 to an API implementation of one or more client programs 106 and/or a third-party application 116 (e.g., third-party web site). The API implementation may comprise, for example, executable code in accordance with a SDK provided by the network-based system 110.

The messaging server 126 may be arranged to communicate with various messaging clients and/or applications such as e-mail, IM, SMS, MMS, telephone, VoIP, video messaging, and so forth. The messaging server 126 may provide a messaging interface to enable access by the client 102 and/or the third party 112 to the various services and functions provided by the application servers 130. For example, the messaging interface provided by the messaging server 126 may be used to communicate with the client 102 and/or the third party 112 in a variety of ways such as via e-mail, IM, SMS, MMS, video messaging, and/or a telephone call (e.g., landline, mobile, VoIP) with a customer service agent and/or IVR system.

When implemented as an online ticket marketplace, the application servers 130 of the network-based system 110 may provide various online marketplace and ticket fulfillment services including, for example, account services, buying services, selling services, listing catalog services, dynamic content management services, delivery services, payment services, and notification services. In the exemplary embodiment shown in FIG. 1, the application servers 130 may comprise an account server 132, a buying server 134, a selling server 136, a listing catalog server 138, a dynamic content management server 140, a payment server 142, a notification server 144, and a delivery server 146 structured and arranged to provide such online marketplace and ticket fulfillment services.

The application servers 130, in turn, may be coupled to and capable of accessing one or more databases 150 including a subscriber database 152, an events database 154, and a transaction database 156. The databases 150 generally may store and maintain various types of information for use by the application servers 130 and may comprise or be implemented by various types of computer storage devices (e.g., servers, memory) and/or database structures (e.g., relational, object-oriented, hierarchical, dimensional, network) in accordance with the described embodiments.

Account Services

The account server 132 implemented by one or more of the application servers 130 may allow a user to establish and/or manage a subscriber account with the network-based system 110. For example, while some services provided by the network-based system 110 may be generally accessible, a user may be required to access an existing subscriber account or register a new subscriber account with the network-based system 110 in order to receive certain customized and/or subscriber-specific services.

To create a subscriber account, a user may provide the network-based system 110 with account information such as a unique username, e-mail address, password, name, location (e.g., address, city, country, and/or zip code), telephone numbers (e.g., home, work, and/or mobile), and/or other required information for identifying and/or authenticating the user. After receiving the required account information and instructions from the user to create the subscriber account, the network-based system 110 may create the subscriber account and store the account information in the subscriber database 152.

To effectuate the buying or selling of goods such as event tickets, the user may be required to link the subscriber account of to a source of funds and/or financial value for completing different transactions via the network-based system 110. It can be appreciated that the user may provide various types of entities or third-party financial accounts capable of supplying or receiving funds and/or financial value in accordance with the described embodiments. Exemplary entities and/or third-party financial accounts may include, without limitation, a bank, bank account, lender, line-of-credit, credit card company, credit card account, debit card, prepaid debit card account, third-party payment services account (e.g., PayPal™ account), payroll account, check, money order, or any other suitable source of financial value.

Additionally or alternatively to linking the subscriber account to a source of financial value based on a commercial currency (e.g., U.S. dollar), a user may link to the subscriber account to a source of financial value based on a proprietary and/or promotional currency (e.g., points, rewards, coupons) capable of accumulation and/or redemption by the user to pay for goods or services. It can be appreciated that multiple sources of funds and/or financial value associated with the user may be linked to the subscriber account enabling the user to select among such sources to effectuate different payment transactions via the network-based system 110. The user may select various options for receiving payment when a sale is effectuated via the network-based system 110. For example, the user may request payment for sales via check, deposit to a third-party payment services account (e.g., PayPal™ account) or Season Ticket Account, and/or other type of source capable of receiving funds and/or financial value in accordance with the described embodiments.

After a subscriber account is created, the user may view and/or make changes to account information, add or edit existing contacts, retrieve or change the password, view and edit sources of funds and/or financial value on file, view and edit payment options, and/or otherwise manage the subscriber account. In various implementations, the user may customize a subscriber account with one or more interests and ticketing preferences. For example, the user may add and edit information associated with the subscriber account regarding one or more cities, venues, artists, teams and sporting events, theaters, and season ticket and packages of interest to the user.

When accessing the subscriber account, the user may view and/or manage various details of past and pending transactions. For example, the subscriber account may provide a seller with details regarding past and pending ticket sale listings (e.g., shipped, canceled, inactive, expired, deleted, active, pending confirmation, awaiting shipment) and may allow the user to track event listings, modify the prices of event listings, view and confirm received orders, view and confirm orders to ship, print or reprint shipping labels, view shipped orders, view canceled orders, view the status of payments and edit payment options, view past payments, and so forth. The subscriber account also may provide a buyer with details regarding past and pending ticket purchase transactions (e.g., past orders, purchased, delivered, canceled, expired, order status, delivery status, active bids, auctions lost) and may allow the user to view order history, track active bids, modify offers, download and print electronic tickets, view and edit payment options, and so forth.

In accordance with various embodiments, sellers with one or more active listings can access an interactive event venue seat map via their "my active ticket listings" page in their account. A "compare prices" icon may be presented for each active listing that, when clicked, displays an interactive event venue seat map for that listing to allow the seller to keep abreast of pricing trends for the event and make necessary pricing adjustments as needed.

The user also may customize a subscriber account with one or more notification preferences. For example, the user may configure the subscriber account to receive notifications, change notifications, and/or discontinue notifications. In some cases, the user may request to receive promotions via an e-mail newsletter featuring events happening in a particular location. The user also may subscribe to receive customized alert notifications in a variety of ways such as via e-mail, IM, SMS, MMS, and/or other suitable delivery mechanism. In addition to receiving such notifications via e-mail, IM, SMS, MMS, the user may access the subscriber account and view recent notifications such as alert notifications and other messages received in the past week.

In accordance with various embodiments, sellers with one or more active listings may choose to and/or automatically receive transactional e-mail messages that complement and drive sellers to an interactive event venue seat map. The transactional e-mail messages may inform sellers that their tickets are still listed and that the event date is approaching and also provide a link to the online ticket marketplace and/or an interactive event venue seat map for the event to allow sellers to view the most recent pricing data.

Selling Services

The selling server 134 implemented by one or more of the application servers 130 may allow a user to offer goods for sale via an online marketplace provided by the network-based system 110. To list goods for sale such as a single or multiple event tickets, a seller may provide the network-based system 110 with required event information such as event, location of the tickets, sale type, ticket quantity, seating details (e.g., section, row, seat, comments), price, and payment method. It can be appreciated that one or more delivery options may be available for selling the tickets depending on the locations of the buyer and the seller, the time remaining before the event, and/or the form of the tickets (e.g., physical tickets, electronic tickets).

After receiving the required event information and instructions from the seller to publish an event listing, the network-based system 110 may create an active event and store the event information in the events database 154 for publication to users of the network-based system 110. The event information stored in the events database 154 may change frequently as new event listings for upcoming events are added and then removed when the tickets for such events listings are purchased. The events database 154 may store relatively static information for an event such as category (e.g., sports, concerts, theater), as well as real-time dynamic information such as current event listings, true levels of ticket inventory, and pricing information for active event listings and sold event listings.

In accordance with various embodiments, the selling server 134 of the network-based system 110 may be configured to obtain and/or provide information for active ticket listings and sold ticket listings. The information may comprise pricing information including active ticket prices (e.g., fixed, auction, and/or declining prices for unsold tickets) and sold ticket prices (e.g., actual prices fans have paid for specific locations) for providing an accurate representation of the current market value of tickets for an event. For each event, the pricing information may comprise data defining active listings (e.g., section, row, quantity, listed price) and sold listings (e.g., section, row, quantity, date, sold price) for each section and for each zone (e.g., aggregated sections) in an event venue.

The pricing information also may include data defining the highest price, the lowest price, and the average price for all active tickets and/or sold tickets within any section or zone. In some implementations, the average price may be calculated as a median price for all active and/or sold tickets within any section or zone by dropping the lowest and highest priced tickets. The pricing information may comprise data defining comparable sections, such as the top ten sections which are closest in price. The pricing information may further comprise the overall average ticket price for an event calculated, for example, by dropping the five lowest and highest priced tickets. The pricing information also may include rising and falling pricing trend information such as price change data (e.g., the percentage change in the average price of sold tickets for an event within the last N number of days), listing rate data (e.g., the percentage change in the amount of active listings within the past week, and/or selling rate data (e.g., the percentage change in the amount of sold tickets within the past week). It can be appreciated that other types of information and/or data may be obtained and/or provided in accordance with the described embodiments.

To create an event listing for publishing tickets for an upcoming event which are for sale, a seller may select the appropriate type of event, city, or venue for event tickets being offered for sale, and then may be queried or prompted to select a specific event after making selections from various categories and subcategories presented via a set of interactive pull-down menus. Once an event has been selected, the seller may provide the price per ticket and the ending date of the sale when the event listing is to be removed from publication. For some events, the event listing may expire three business days before the event. In certain markets, tickets may be sold on consignment and the listing may remain until the start of the event.

In some cases, if the seller has additional tickets to list for the same event or for the same team (e.g., season tickets), the seller is able to start the listing process for the additional tickets with the previously selected ticket event (e.g., Mar. 20, 2007 Dallas Mavericks @ New York Knicks), the previously selected genres (e.g., sports, basketball, NBA, 2006-20007 regular season, New York Knicks), and/or the previously selected seats. For example, the seller may list multiple tickets as described in co-pending U.S. patent application Ser. No. 11/689,787 titled "System and Method for Posting Multiple Items for Sale," which was filed on Mar. 22, 2007 and is incorporated by reference in its entirety.

In accordance with various embodiments, the seller creates an event listing for publishing tickets to an upcoming event which are for sale. To create the event listing, the seller may be presented with a pull-down menu listing categories such as sports tickets, concert tickets, theater and arts tickets, and ticket gift certificates. If the seller selects the sports tickets category, a pull-down menu listing sports tickets such as baseball tickets, basketball tickets, football tickets, and other types of sports tickets is presented. If the seller then selects football tickets, a pull-down menu listing sports subcategories such as NFL tickets, CFL tickets, and NCAA tickets is presented. If the seller selects the NFL tickets, a pull-down menu listing ticket subcategories such as NFL regular season tickets, NFL playoff tickets, and NFL pro bowl tickets is presented. If the seller selects the NFL regular season tickets, a pull-down menu listing NFL teams is presented. Once the seller selects tickets for particular NFL team, a listing of available events including event details (e.g., team and opponent, date, time, venue name) for the team are displayed which can be sorted by event, date, and venue. The seller may then select an event from the listing of available events. It can be appreciated that appropriate sets of pull-down menus for listing categories and successive subcategories may be presented for any type of event ticket in accordance with the described embodiments.

After an event has been selected, the seller may provide the network-based system 110 with the shipping location of the tickets and verify current contact information (e.g., address and telephone phone number). The seller may select from various delivery options (e.g., courier, electronic delivery) and provide a sale type such as a fixed price sale (e.g., set price capable of subsequent modification), a declining price sale (e.g., automatically decreasing price over time from maximum price to minimum), or an auction sale (e.g., buyers bid from a starting price during an open period with the highest bidder placing an order when the auction closes).

The seller may provide the ticket quantity for specific seats or general admission. The seller may provide the ticket quantity and may allow the quantity of offered tickets to be split among several buyers in multiples of two. The seller may provide seating and ticket details for the offered tickets such as section, row, seat numbers, and may provide other comments. In some cases, the seller may select to prevent buyers from viewing the specific seat numbers when the event listing is published by the network-based system 110.

In accordance with various embodiments, when entering seating and ticket details, the seller may be presented with a user interface that provides a "lookahead" section filter. As the seller begins to type partial information for an event that is associated with an interactive event venue seat map into a "section" field, the field is read, and relevant sections are displayed to the seller in a drop down menu. The seller may then choose the section from the menu making the entering of ticket details easier for the seller and reducing the number of listings that go unmapped and therefore unsold.

After the seller has provided the required seating and ticket details, the seller is prompted to enter a price per ticket and payment method. The seller may provide a selected payment method for the sale of the tickets such as via check, deposit to a third-party payment services account (e.g., PayPal™ account), Season Ticket Account, and/or other type of source capable of receiving funds and/or financial value. The seller also may select to donate some or all of the proceeds of a sale to a third-party such as a non-profit organization or entity (e.g., charity, foundation, fund, alliance, society) as described in co-pending U.S. patent application Ser. No. 10/697,850 titled "System and Method for Providing Logistics for a Sale or Transfer of Goods with Proceeds Provided to a Third Party," which was filed on Oct. 30, 2003 and is incorporated by reference in its entirety.

In accordance with various embodiments, the listing process for sellers includes a price mapping feature that introduces sold ticket data in a uniformly displayed interactive event venue seat map for enabling sellers to view both sold and current listing data for any section or zone in an event venue. When entering pricing information, the seller may be presented with a user interface for entering payment method and pricing information that provides a "compare prices" feature. In addition to providing a "price" field for allowing the seller to enter a price per ticket, the user interface may provide a "compare prices" icon. When the "compare prices" icon is clicked, the seller is presented with an interactive event venue seat map regardless of whether the seller has entered pricing information.

In one or more implementations, the interactive event venue seat map may be displayed within a DIV pop-up overlay that substantially overlays (e.g., 70% overlay) the user interface for entering the payment method and pricing information. The overlay may provide the event information (e.g., event name, venue, and date), ticket details (e.g., section and row entered by the seller), pricing trend information (e.g., rising or falling sales), and an event summary (e.g., average price for the event, number of active listings, and number of sold listings). The overlay also may include a "price input" field for entering and/or editing a price per ticket. In some cases, the "price input" field may be prepopulated with previously entered pricing information. When pricing information (e.g., price per ticket) is included in the "price input" field, the overlay may provide a ticket price comparison showing the total number of comparable sections.

In accordance with various embodiments, the overlay comprises an interactive event venue seat map comprising a layout of the event venue indicating sections of the event venue for which tickets are listed. In response to the ticket details (e.g., section and row entered by the seller), a tabbed sold/active pop-up window is displayed that overlays a portion of the interactive event venue seat map that presents the name of the section entered by the seller and available pricing information for the section and corresponding tab (e.g., sold tab or active tab). In one implementation, the sold/active pop-up window presents the lowest (sold/active) price for the section, the average (sold/active) price for the section, the highest (sold/active) price for the section, and corresponding indicators. When pricing information is available for the section of the seller, a section marker pointing to the section and indicating the average price for the section is also presented on the interactive event venue seat map. If there is no available pricing information for the section of the seller, a message is displayed requesting the seller to click on a comparable section.

When pricing information is available for the section, the sold/active pop-up window also presents ticket details and transaction information for sold or active event listings that may be displayed in columns that can be sorted by the seller. The ticket details for sold event listings may include row and quantity, and the transaction information for sold event listings may include the sold date and price paid. The ticket details for active event listings may include row and quantity, and the transaction information for active event listings may includes the listed price per ticket.

In response to the price per ticket entered by the seller, section markers pointing to comparable sections that are within a predetermined range of the price per ticker entered by the seller and indicating the average price for tickets within each comparable section are presented on the interactive event venue seat map. Such section makers show sections where the average sold price is close to the price that the seller is considering which helps the seller pinpoint sections to look at in more detail.

The interactive event venue seat map allows the seller to browse and click on sections to see sold and listed data for any section in the event venue. When presented with the interactive event venue seat map, the seller may roll over a particular section causing a roll-over screen to appear that includes the section name, the average sold price for tickets in the section, and the average listed price for tickets in the section. If the particular section is clicked and pricing information is available for the zone, the sold/active pop-up displays the section name and presents ticket details and transaction information for sold or active event listings within the section.

The interactive event venue seat map also provides a zone view that allows sellers to click on any zone name in a zone legend to see all sold and listed data for that zone. If a zone name is clicked and pricing information is available for the zone, the sold/active pop-up displays the zone name and presents ticket details and transaction information for sold or active event listings within the zone. If the sold tab is selected, the ticket details include section, row, and quantity, and the transaction information includes the sold date and price paid. If the active tab is selected, the ticket details include section, row and quantity, and the transaction information includes the listed price per ticket. When the seller clicks a different tab, pricing information, ticket details, and transaction information corresponding to the different tab is presented if available.

The interactive event venue seat map also provides a "compare feature" to provide sellers with a quick visual indication whether a proposed sale price is within a sale price range determined from sold and current listing data of other similar listings. For example, the seller may enter or edit and price per and use the compare feature to view a list of comparable sections and available pricing information. After being presented with market value information and finally deciding on a price per ticket, the seller can save and/or update the price of a ticket for a new or existing event listing.

In general, the interactive event venue seat map provides sellers with the opportunity to view pricing details to allow for a more accurate picture of the current market value of their tickets. Accordingly, sellers are better able to price their tickets based on the truest market value, resulting in a quicker sale. In some embodiments, the interactive event venue seat map also may provide a visual warning to a seller when a proposed price is not competitive with respect to sold and current listing data of other similar listings.

Buying Services

The buying server 136 implemented by one or more of the application servers 130 may allow a user to locate goods offered for sale via an online marketplace provided by the network-based system 110. To find goods for sale such as a single or multiple event tickets, a buyer may view active event listing published by the network-based system 110.

In accordance with various embodiments, information may be presented to and/or received from information from the user via one or more user interfaces presented on the display of a client device (e.g., PC or mobile device). The user interfaces presented to the user by a client-side web application may comprise a search engine interface (e.g., text entry boxes, input fields, checkboxes, clickable hyperlinks, pull-down menus, etc.) for allowing the user to provide event criteria for searching and/or filtering event listings. The user interfaces presented to the user also may comprise search results including upcoming event listings that satisfy the event criteria.

For example, the buyer may browse active event listings by clicking and following links for various event categories and subcategories such as sports tickets, concert tickets, theater tickets, cities, sports, teams, artists, show type (e.g., Broadway, opera, ballet, comedy), event names, and so forth. The buyer also may search for events using a search engine interface and/or one or more pull-down menus. For example, the buyer may enter one or more keywords into a search engine text entry box and view results comprising active events that satisfy the query. In various implementations, the buyer may be presented with a ticket finder screen comprising a plurality of pull-down menus for allowing the buyer to quickly formulate a search by selecting a category (e.g., sports, concert, theater, etc.), a location (e.g., city), and a number of tickets from the pull-down menus.

In some embodiments, a user may search for and/or request upcoming event information based on a variety of event criteria such as an event name, category, city, venue, artist, genre, team, player (e.g., starting pitcher, favorite player), theater, date range, date, number of tickets, price range, ticket attributes (e.g., zone range, zone, section range, section, row range, row, seat number range, seat number), and/or combination thereof. Accordingly, the event criteria included in a search query may comprise ticket attributes as well as one or more conditions associated with the event parameters for requesting information for such upcoming events only when such conditions are met.

It can be appreciated that various combinations of event criteria are possible in accordance with the described embodiments. For example, a user may request upcoming event information specifying combinations such as a certain number of tickets and a maximum price, a particular artist and a certain city, a certain player and a particular event venue, and so forth. A user also may request upcoming event information based on one or more ticket attributes. For instance, a user may request a certain number of tickets for an upcoming event in one or more specified zones, sections, rows, and/or or seats. Additionally, event criteria may be applied alone or in combination across one or more events. A user may request, for example, tickets in a certain row (e.g., front row) or row range (e.g., rows 1-5) within a specified zone (e.g., club infield) or section (e.g., section 224) for a designated team (e.g., professional baseball team) and/or for one or more games (e.g., particular opponent, rivalry game). The embodiments are not limited in the regard.

It can be appreciated that in some cases, an upcoming event may not satisfy all event criteria specified by the user. For example, tickets for an upcoming event may be available but not within a price range specified by the user. Additionally, there may be no upcoming events that satisfy the event criteria specified by the user when there are no available tickets such as when no sellers have listed tickets for an event and/or before tickets for an event go on sale. In such cases, the client-side web application may inform the user that there are no search results satisfying the search criteria and then perform a new search with relaxed search criteria. Alternatively or additionally, the client-side web application may automatically relax the search criteria and attempt another search.

Once a buyer has located and selected an event, the tickets being offered for sale for the event may be presented to the buyer. In various embodiments, the user may view the details of tickets being offered for sale and the location of tickets in the event venue as described in co-pending U.S. patent application Ser. No. 11/552,782 titled "Method and System for Illustrating Where a Ticket is Located in an Event Venue," which was filed on Oct. 25, 2006 and is incorporated by reference in its entirety. In such embodiments, the buyer may be presented with an interactive event venue seat map and details of available tickets according to criteria specified by the buyer.

In one implementation, for example, after selecting an event the buyer may be presented with an interactive event venue seat map and an initial listing of all event tickets for sale. The event listings may include details such as section, row, quantity, and price and may be sorted by the buyer according to such details. The sections of the interactive event venue seat map for which tickets are available may be displayed in color while sections having no available tickets may be displayed in white.

Within the interactive event venue seat map, comparable or similarly-located (e.g., upper level) sections having available tickets may be displayed in the same color while sections having available tickets that are not comparable or similarly-located may be displayed in different colors. For example, the colors used in the sections may correspond to zones for the sections with each zone comprising several comparable or similarly-located sections. Along with the interactive event venue seat map, the buyer may be presented list comprising the different zone names and the color used for each zone. The names of zones having available tickets may be displayed in black text, while the names of zones having no available tickets may be displayed in gray text.

When presented with the interactive event venue seat map, the buyer may roll over a particular section causing a roll-over screen to appear indicating the quantity and price range of tickets available in that section. By clicking on a particular section, the event listings may be filtered to display only the event listings in the selected section along with the specific details (e.g., section, row, quantity, price) for such tickets. The buyer also may zoom-in, zoom-out, drag, and/or rotate the interactive event venue seat map.

When presented with the initial listing of all event tickets for sale, the buyer may filter the initial listing by inputting criteria such as one or more price ranges (e.g., $75-$286, $286-$349, $349-$442, $442-$559, and $559 and up). Once the buyer selects a price range, the event listings are filtered to display only the event listings in the selected price range. Additionally, the interactive event venue seat map is modified to display sections in color for which tickets are available in the selected price range.

Each event listing may include ticket attributes such as section, row, quantity, and price. Each listing also may include a link to view additional details that when clicked may display the ticket attributes along with further ticket details (e.g., seat numbers, time remaining to purchase the tickets, seller comments, delivery options), a selectively enlargeable image of the event venue for reviewing the location of the seats, and an action button for initiating purchase of the tickets.

To place an order for the tickets, the buyer may provide a delivery location, select a method of payment (e.g., credit card), confirm the transaction details (e.g., description of the tickets, delivery method, delivery location, payment amount, and method of payment), and the complete the purchase. When the buyer places the order, a confirmation e-mail is sent to the buyer, and the seller is notified of the order request via e-mail and requested to confirm the availability and delivery of the tickets. Upon receiving confirmation from the seller that the tickets have been sent, the buyer is notified as to when delivery can be expected. It can be appreciated that upon the sale of the tickets, one or more delivery options may be available depending on the locations of the buyer and the seller, the time remaining before the event, and/or the form of the tickets (e.g., physical tickets, electronic tickets).

Listing Catalog Services

The listing catalog server 138 implemented by one or more of the application servers 130 may be arranged to receive and respond to queries and/or to provide access to event information stored in the events database 154. A query to the listing catalog server 138 may comprise, for example, a search query, web query, web feed request (e.g., RSS feed request, ATOM feed request), API request, HTTP request (e.g., Get, Post, etc.), a web form submission (e.g., XHTML/HTML form), and/or suitable request mechanism in accordance with the described embodiments. In various implementations, a query may be submitted to the listing catalog server 138 via one or more communications servers 120 from one or more client devices 104, client programs 106, a third-party server 114, and/or a third-party application 116. Queries also may be submitted to the listing catalog server 138 internally from other application severs 130 of the network-based system 110.

In one embodiment, the listing catalog server 138 may be implemented by a distributed architecture comprising a plurality of distributed indexing modules. Each of the distributed indexing modules may provide an interface for receiving queries from front-end servers such as the communications servers 120. The distributed indexing modules may store and build updatable indexes against which a query can be checked to expedite retrieval of a query result. The indexes may comprise, for example, common keywords or search terms and event IDs linked to such keywords or search terms. The distributed indexing modules also may cache common query results.

The distributed indexing modules may be arranged to receive updated indexing information brokered via a message bus from a local gatherer module. The local gatherer, in turn, may be coupled to and collect indexing information from the events database 154. The indexing modules may update and/or filter the indexes based on the updated information received from the local gatherer module and/or information from other indexing modules.

The local gatherer module may be arranged to periodically scan items stored in the events database 154 and obtain updated indexing information. For example, the local gatherer module may request items from the events database 154 that have changed within a given time period. The event information stored in the events database 154 may change frequently as new event listings for upcoming events are added and then removed when the tickets for such events listings are purchased. Furthermore, the events database 154 may store relatively static information for an event such as category (e.g., sports, concerts, theater), as well as real-time dynamic information such as current event listings and true levels of ticket inventory. It can be appreciated that the event information maintained by the events database 154 may be extremely dynamic especially in cases where LMS and electronic ticketing services are provided by the network-based system 110.

The listing catalog server 138 may receive and respond to the queries with event information for upcoming events that satisfy such queries. The event information may be provided locally from the listing catalog server 138, if available (e.g., cached), and/or may be retrieved by the listing catalog server 138 from the events database 154. In various implementations, event information from the listing catalog server 138 may be communicated via one or more communications servers 120 to one or more client devices 104, client programs 106, a third-party server 114, and/or a third-party application 116. The event information from the listing catalog server 138 also may be provided internally to other application severs 130 of the network-based system 110.

Exemplary event information parameters that may be included in the response from the listing catalog server 138 are described below in the following table.

| Event Information Parameter Table | |
|---|---|
| Event Parameter | Details |
| act_primary | Home Team Mascot |
| act_secondary | Away Team Mascot |
| active_type | 1 = active event |
|  | 0 = inactive event |
| allowedtosell | 1 = general public allowed to sell tickets |
|  | 0 = generatl public not allowed to sell tickets |
| ancestorGenreIds | List of parent IDs, in order of hierarchy, identifying browsing path to reach the node |
| ancestorGeoIds | List of geography IDs, in order of hierarchy, identifying browsing path to reach the geography node |
| canceled | 1 = event has been canceled |
|  | 0 = event has not been canceled |

-continued

Event Information Parameter Table

| Event Parameter | Details |
| --- | --- |
| channel | Name of the top level genre in the breadcrumb trail tied to the event |
| channelId | ID of the top level genre in the breadcrumb trail tied to the event |
| channelUrlPath | URL path for the top level genre in the breadcrumb trail tied to the event |
| channel_facet_str | ID and Name of the top level genre in the breadcrumb trail tied to the event |
| city | City of the event |
| date_last_modified | Time of last change to the event |
| description | Name of the event |
| eventDate_facet_str | Month and year of the event, numeric (yyyy-mm) and alpha (month, yyyy) |
| eventGeoDescription | Name of venue |
| event_date | Date and time of the event (GMT) |
| event_date_local | yyyy-mm-dd of the event |
| event_date_time | Date and local time of the event |
| event_id | Unique ID of the event |
| event_time_local | Local time of the event |
| genreUrlPath | URL path for the parent genre of the event |
| genre_parent | ID of the parent genre of the event |
| geoUrlPath | URL path for the venue of the event |
| geography_parent | ID of the parent geo of the venue |
| hide_event_date | 1 = event date hidden<br>0 = event date not hidden |
| id | ID of the event |
| last_chance | Date and time to delist the event used in place of the actual event date due to shipping rules |
| maxPrice | Highest ticket price for the event |
| maxSeatsTogether | Maximum number of successive seats that can be purchased together |
| minPrice | Lowest ticket price for the event |
| name_primary | Event match-up using team mascots (e.g., Mets vs Braves) |
| name_secondary | Full name of the away team (e.g., New York Mets) |
| spark_event_flag | Event marked as a "hot" event |
| state | State of the event |
| totalPostings | Number of actual postings for the event |
| totalTickets | Actual number of tickets listed for the event |
| venue_config_id | Configuration of the venue for the event |

It can be appreciated that, in some implementations, not all of the event information parameters included in the table may be necessary to present the requested upcoming event information to the user. Accordingly, when all of the event information parameters are included, the response may be parsed to extract only those event information parameters that are needed. Alternatively, the query and/or the response may be configured to request and respond with only those event information parameters necessary to display the requested upcoming event information. It also can be appreciated that the response may include different event information parameters and/or additional event information parameters than those described in the table.

Dynamic Content Management Services

The dynamic content management server 140 implemented by one or more of the application servers 130 may be arranged to provide a user with relevant and/or related dynamic content customized according to a particular context of the user. The dynamic event information may comprise, for example, event information that changes as new event listings for upcoming events are added and as event listings are removed when the tickets for such events listings are purchased and real-time event-specific information such as current event listings, price ranges, and true levels of ticket inventory. Relevant or related dynamic content may comprise, for example, dynamic content customized according to the location of the user such as location-based advertising content (e.g., banner ads), relevant and/or related categories and subcategories (e.g., links for local sports teams, artists performing in the location, theater shows playing in the location), a list of event names and dates for upcoming events in the location arranged by category, and/or other type of dynamic featured content that changes according to the location of the user.

In some implementations, the appearance of a user interface displayed to the user may be customized or branded with dynamic content based on the location of the user and/or event criteria specified by the user. For example, a web page or web client may comprise a comprise a header, skin, or other designated area that dynamically displays different graphics (e.g., pictures, logos, backgrounds, etc.), advertisements, news, and/or other featured content received from the network-based system 110 according to the location and/or event criteria of the user.

In various embodiments, the dynamic content management server 140 may be structured, arranged, and/or configured to bind dynamic information to a particular node and/or combination of nodes defining the context of the user. Exemplary nodes may include, for example, geography nodes (e.g., event cities), category nodes (e.g., sports, concerts, theater), sports nodes (e.g., baseball, football, basketball), sports subcategory nodes (e.g., professional, college), music genre nodes (e.g., jazz, rock, alternative), theater subcategory nodes (e.g., musical, comedy), ticket subcategory nodes (e.g., regular season, playoff, bowl), conference nodes, team nodes, artist nodes, theater show nodes, venue nodes, event nodes, and so forth. It can be appreciated such nodes may be arranged (e.g., hierarchically) and/or in other ways in accordance with the described embodiments.

The dynamic content management server 140 may be configured bind dynamic content such as relevant and/or related categories and subcategories, event listings for upcoming events, promotional or advertising content, UI graphics, and/or various other types of customized content to a node or combination of nodes. When navigating a web site provided by the network-based system 110, for example, the user may be presented with links for selecting from among various locations, categories, and/or subcategories and for viewing content associated with such selections. When the user makes a particular selection, the context of the user may be defined by one or more nodes associated with such selection, and the user may be presented with dynamic content customized to the context of the user.

In various embodiments, the dynamic content management server 140 may implement a front-end query tool and presentation layer to query the listing catalog server 138 according to the context of the user. In response to the query, the dynamic content management server 140 may receive dynamic content (e.g., XML content) from the listing catalog server 138 and provide the dynamic content to one or more dynamic content modules embedded in a web page presented to the user. Accordingly, the content associated with event listings may change based on the context of the user, configurable parameters, and/or available inventory.

In one example, a user selects a particular city, and the dynamic content management server 140 has bound dynamic content to a geography node associated with the particular city. Upon selection of the particular city by the user, the context of the user may be defined at least in part by the geography node of the selected city, and the user may be presented with the dynamic content that is bound to the geography node. In this case, the user may be presented with a web page including dynamic content customized for the particular city such as graphics (e.g., pictures, background) and advertising content (e.g., banner ads) for the particular city, relevant and/or related categories and subcategories (e.g., links for local sports teams, artists performing in concert in the city, theater shows playing in the city), a list of event names and dates for upcoming events in the city arranged by category, and/or other type of dynamic content that changes according to the city selected by the user.

In another example, a user selects a particular football team, and the dynamic content management server 140 has bound dynamic content to a team node associated with the particular football team. Upon selection of the team by the user, the context of the user may be defined at least in part by the team node, and the user may be presented with the dynamic content that is bound to the team node. In this case, the user may be presented with a web page including dynamic content customized for the particular team. For example, the web page presented to the user may be dynamically branded with graphics (e.g., pictures, background), advertising content (e.g., banner ads), and/or news associated with the particular team. The user also may be presented with event listings for upcoming games for the team as well as relevant and/or related categories and subcategories (e.g., links for road games, playoff games) for the team. In this implementation, the context of the user may be defined by one or more other nodes in a hierarchical path to the team node such as a category node (e.g., sports), sports nodes (e.g., football), sports subcategory node (e.g., professional), and ticket subcategory node (e.g., regular season). As such, the user may be presented with dynamic content bound to one or more of such nodes such as links to other professional football teams for which regular season tickets are available.

It can be appreciated that the embodiments are not limited to the foregoing examples and that dynamic content may be bound to a particular nodes and/or a combination of nodes for customizing that content displayed to a user based on the context of the user. Accordingly, the dynamic content management server 140 may be used to create dynamic content campaigns including a various types of static and dynamic content and to bind such campaigns to nodes or groups of nodes that define a context of the user. It also can be appreciated that a node and/or combination of nodes can be detected as a user selects one more links and/or in other ways such as when a query is submitted (e.g., text entry, selection of checkboxes, selection from a pull-down menu), a search result is returned, or in any other way in accordance with the described embodiments.

Payment Services

The payment server 142 implemented by one or more of the application servers 130 may be arranged to effectuate and/or manage payments between buyers and sellers and to post and track financial transactions for users of the network-based system 110. Transaction information for past and pending transactions may be stored by the network-based system 110 in the transaction database 156. The payment server 142 also may provide dispute resolution mechanisms to handle payment disputes arising between transacting parties and/or fraud prevention mechanisms to prevent fraudulent transaction, unauthorized use of financial instruments, non-delivery of goods, abuse of personal information, and so forth. While the payment server 142 is shown in FIG. 1 as forming part of the networked-based system 110, it will be appreciated that the payment server 142 may form part of a third-party payment system that is separate and distinct from the network-based system 110 in alternative embodiments.

In various implementations, the payment server 142 may account for a transfer of funds and/or financial value by debiting the a source of funds and/or financial value linked to the subscriber account of the buyer and crediting a source of funds and/or financial value linked to the subscriber account of the seller. For example, the network-based system may securely communicate with one or more financial institutions such as a bank or credit card company over one or more networks 108 and arrange the transfer of funds and/or financial value from the buyer to the seller. It can be appreciated that while certain settlement mechanisms may be described for purposes of illustration, the embodiments are not limited in this regard, and a variety of settlement networks and modalities may be used in accordance with the described embodiments.

In one embodiment, after the buyer reviews and confirms an order, the account (e.g., credit card) of the buyer is verified, and the sale amount (e.g., ticket price plus delivery cost) is authorized. The seller is notified of the proposed purchase by e-mail or other notification mechanism and requested to confirm that the tickets are still available and that the transaction can be completed.

Upon receiving confirmation from the seller, the account (e.g., credit card) of the buyer is charged. Funds from the account of the buyer may be electronically transferred into a merchant account associated with the network-based system 110, and a transaction fee may be deducted. The remaining proceeds are then directed to the seller by issuing a payment in accordance with the payment method selected by the seller such as via check, deposit to a third-party payment services account (e.g., PayPal™ account), Season Ticket Account, and/or other type of source capable of receiving funds and/or financial value, and/or donation to a third-party such as a non-profit organization or entity.

It can be appreciated that the network-based system 110 may provide a "double blind" complete ticket-sale transaction without interaction between buyer and seller. Namely, the network-based system 110 may facilitate an entire ticket-sale transaction without requiring any interaction between the seller and the buyer. The network-based system 110 controls and/or facilitates the entire sale and purchase process and serves as an intermediary between the buyer and seller effectively isolating the participation of the seller in the transaction from the participation of the buyer in the transaction. Accordingly, the identity of one transacting party can remain concealed from the other.

Notification Services

The notification server 144 implemented by one or more of the application servers 130 may be arranged to generate and send various types of notifications to users of the network-based system 110. The notification server 144 may communicate with users over one or more types of networks 108 (e.g., the Internet, a WAN, a WWAN, a WLAN, a mobile telephone network, a landline telephone network, a VoIP network, etc.) via interfaces provided the communications servers 120 such as the web server 122, API server 124, and/or messaging server 126. It can be appreciated that, in some implementations, notifications may be forwarded to users via an intermediary such as an Internet Service Provider (ISP), online service provider (OSP), web-based e-mail service provider, message aggregator (e.g., SMS aggregator), mobile transaction network entity, and so forth.

The notifications may comprise messages delivered to users via e-mail, IM, SMS, MMS, video message, telephone call as well as messages delivered to the subscriber account of the user. In some cases, the notifications may provide the user with information related to various online marketplace transactions. For example, notifications may be sent to sellers for indicating the status of event listings, informing the seller of offers (e.g., auction bids) for event listings or sales of similar tickets and allowing the user to modify the prices of event listings, notifying the seller of placed orders and requesting confirmation of the availability of tickets for such orders, providing delivery instructions and requesting confirmation of delivery, tracking shipped orders, providing the status of payments, and so forth. Notifications may be sent to buyers for tracking ticket purchase transactions (e.g., active bids, auctions lost) for event listings and allowing the buyer to modify offers, confirming an order and delivery, tracking shipped orders, providing pick-up instructions and requesting confirmation of receipt, downloading and print electronic tickets, and so forth.

In accordance with various embodiments, sellers with one or more active listings may choose to and/or automatically receive transactional e-mail messages that complement and drive sellers to an interactive event venue seat map. The transactional e-mail messages may inform sellers that their tickets are still listed and that the event date is approaching and also provide a link to the online ticket marketplace and/or an interactive event venue seat map for the event to allow sellers to view the most recent pricing data.

In some implementations, a buyer may subscribe to receive customized alert notifications for upcoming events as described in co-pending U.S. patent application Ser. No. 12/262,468 titled "System and Methods for Upcoming Event Notification and Mobile Purchasing," which was filed on Oct. 31, 2008 and is incorporated by reference in its entirety. In such implementations, the notification server 144 may be arranged to generate and send an alert notification comprising a text message including relevant static or dynamic event information as well as an embedded hyperlink. The hyperlink may comprise a hyperlinked telephone number for allowing the user to place a telephone call to an agent of the network-based system 110 for transacting a mobile purchase. Alternatively or additionally, the hyperlink may comprise a URL or URI for navigating to the network-based system 110 for transacting the mobile purchase.

It can be appreciated that in some cases, an upcoming event may not satisfy all event criteria specified by the user. In some implementations, when there are no upcoming events that satisfy all the event criteria specified by the user, the user may choose to receive alert notifications for one or more upcoming events conditioned on the complete satisfaction of the event criteria. In such implementations, the network-based system 110 may allow the user to select to receive an alert notification whenever an upcoming event that substantially and/or completely satisfies the search criteria is listed. For example, the user may choose to receive "on sale" alert notifications when tickets that satisfy one or more preferences of the user become available. The network-based system 110 also may provide the user with various capabilities (e.g., preference settings and options) to allow the user to receive "on sale" alert notifications for preferred tickets and to allow the user to automatically and/or optionally purchase such preferred tickets.

Delivery Services

The delivery server 146 implemented by one or more of the application servers 130 may arrange the delivery of goods from the seller to the buyer. For the delivery of time-sensitive goods such as a single or multiple event tickets, the network-based system 110 may determine and present delivery options that ensure that an event ticket is delivered to the buyer before an event and the costs associated with such delivery options.

In various embodiments, the network-based system 110 may coordinate the delivery of event tickets as described in co-pending U.S. patent application Ser. No. 09/867,171 titled "System and Method for Providing Logistics for a Sale of Goods," which was filed on Sep. 27, 2001 and is incorporated by reference in its entirety. In such embodiments, the network-based system 110 may automatically arrange and/or facilitate the logistics for the delivery of event tickets from the seller to the buyer.

In one implementation, for example, when the buyer places an order, available delivery options are presented to the buyer that ensure that the event tickets can be delivered before the event either to the buyer or to a pick-up location (e.g., event venue will call or an office of the network-based system 110) in proximity to the buyer. The network-based system 110 may determine all available delivery options based on the form of the tickets (e.g., physical tickets, electronic tickets), the time remaining before the event, the location of the goods, the location of the buyer, pick-up locations in proximity to the buyer, and/or the capabilities one or more couriers (e.g., air/land couriers, express couriers, local couriers or "runners") that can execute the delivery within the time remaining before the event.

When a physical ticket is to be delivered, the network-based system 110 may determine and present shipping options to the buyer. The buyer may provide a delivery or pick-up location, and the network-based system 110 may automatically determine couriers capable of ensuring delivery and present a list identifying the couriers, the available shipping methods (e.g., two day, one day, overnight, same day) for each courier, and the associated cost of each shipping method.

When a courier and shipping method is selected by the buyer, the seller may be notified and presented with a printable shipping label for the courier and logistics for providing the tickets to the courier. For example, the network-based system 110 may automatically determine the closest courier facility in proximity to the seller and may allow and arrange for the courier to retrieve the tickets. In such cases, the network-based system 110 may communicate relevant information (e.g., seller address, delivery address, pick-up day and time frame) to the courier in order to coordinate ticket retrieval. If the courier cannot service any of the selected locations at any of the selected times, the network-based system 110 may require the seller to drop off the tickets at the nearest courier facility. The seller also may select to drop off the tickets at the nearest courier facility. If the seller selects or is required to drop off the tickets, the buyer may be provided with the location of the courier facility, driving or walking directions to the courier facility, and/or a map showing the courier facility.

Upon confirmation by the seller that the tickets have been sent or picked up, the network-based system 110 may communicate delivery tracking information to the buyer and/or seller. The network-based system 110 may notify the buyer of the delivery location and expected time and date of delivery. If the delivery location is at a pick-up location such as the event venue will call or an office associated with the network-based system 110, the buyer may be provided with the pick-up location, driving or walking directions to the pick-up location, and/or a map showing the pick-up location.

To ensure delivery to the buyer before an event, a last sale time may be associated with an event listing. In some cases, for example, the last sale time for an event listing may be three business days before the event to provide sufficient transit time to ensure completion of delivery. In such cases, the event listing will expire at the last sale time.

Last Minute Services

It can be appreciated that both sellers and buyers may desire the last sale time to be as close to the event start time as possible in order to maximize the opportunity to make a sale and the opportunity to witness an event. Accordingly, the network-based system 110 may provide sellers and buyers with various last minute services (LMS) for maintaining an event listing and the ability to sell and purchase listed tickets right up to the start of the event.

In one implementation, for example, the network-based system 110 may allow tickets to be sold on consignment and may maintain an event listing until the start of the event. When a seller requires delivery of physical tickets for an upcoming event, the seller may select to sell the tickets using LMS provided by the network-based system 110. The seller may request LMS and provide the network-based system 110 with contact information (e.g., name, address, telephone number, e-mail address), ticket information (e.g., event name, event venue, ticket event dates, closest city to the event), and authorization to release the tickets.

In response to the LMS request, the seller may be contacted by an agent of the network-based system 110 via telephone or other contact method and provided with additional selling information. Depending on the time remaining before the event, the seller may be instructed to ship or physically deliver the tickets to an LMS center associated with the network-based system 110. Typically, the location of the LMS center will be in close proximity to the event venue. The seller also may select to physically deliver the tickets to the LMS center. When physical delivery of the ticket to the LMS center is required or selected, the seller may be provided with the location of the LMS center, driving or walking directions to the LMS center, and/or a map showing the LMS center.

Once the tickets are delivered to the LMS center, the event listing may be maintained until the start of the event and the subsequent delivery of the tickets to a buyer is handled by the network-based system 110. For example, the LMS center and/or the network-based system 110 may handle the responsibility of shipping the tickets to the buyer, delivering the tickets to the event venue will call, and/or the keeping the tickets at the LMS center until pick-up by the buyer. It can be appreciated that the LMS provided by the network-based system 110 may facilitate delivery and allow the network-based system 110 to defer the last sale time until the start of the event.

Electronic Ticketing Services

In various embodiments, the network-based system 110 may provide electronic ticketing services for allowing a buyer to purchase one or more electronic tickets that can be used at the event venue. It can be appreciated that providing such electronic ticketing services may allow the network-based system 110 to defer the last sale time until the start of the event.

When the user selects an upcoming event from event listings published by the network-based system 110, a web page may be presented to the user that includes event information for the selected upcoming event such as the name of the event, the date and time of the event, the event venue, available ticket listings including ticket attributes (e.g., section, row, quantity, price), and so forth. In some cases, a purchaser of event tickets may provide the event information to the network-based system 110 in order to list the tickets for sale on a secondary market. In other cases, the venue, event promoter, or other type of ticket issuer may provide the network-based system 110 with event details such as event description, event venue, event date and time, artist, and so forth. In response, the network-based system 110 may manage the event, enable the venue to sell tickets for the event, manage the generation and distribution of electronic tickets, and facilitate the use of electronic tickets for access control to the venue. For example, the network-based system 110 may create an event listing, generate electronic tickets, publish available tickets for sale, and coordinate the sale of the electronic tickets.

In various embodiments, a web page presented to a user may comprise the event information along with a link to purchase electronic tickets and/or a link to view additional details. By clicking the link to purchase electronic tickets, the user may initiate a purchase of one or more electronic tickets. By clicking the link to view additional details, a subsequent web page may be displayed including ticket attributes along with further ticket details (e.g., seat numbers, time remaining to purchase the tickets, seller comments, delivery options), a selectively enlargeable image of the event venue for reviewing the location of the seats, and an action button for initiating purchase of the tickets. In some cases, one or more web pages may include a link to view delivery options such as a location of, driving or walking directions to, and/or a map showing a pick-up location.

To effectuate an electronic ticket purchase, the user may be prompted to enter account information such as a unique username or e-mail address and a password. Upon receiving the required account information, the user is authenticated with the network-based system 110 and may initiate an electronic ticket purchase. After authentication, the network-based system 110 may transact the purchase using a source of financial value linked to the subscriber account of the user or may request the user to supply payment information (e.g., credit card account, PayPal™ account, etc.) for the transaction.

In various embodiments, a user may purchase electronic tickets and/or save electronic ticket information using a web client such as a web browser, web browser toolbar, and/or a desktop or mobile widget. For example, a user may save an electronic ticket and/or a hyperlink to a file associated with the electronic ticket in a subscriber account, in the web browser toolbar, and/or within a desktop or mobile widget. The user also may display information for and differentiate among purchased electronic tickets on a client device (e.g., PC or mobile device) via the web client.

The buyer may purchase one or more electronic tickets using a credit card or other source of funds or financial value linked to the subscriber account of the buyer. In one or more embodiments, the network-based system 110 may provide variable distribution and access control for purchased electronic tickets. For example, the network-based system 110 may provide the buyer with various delivery options for receiving and/or delivering the purchased electronic tickets.

The network-based system 110 may allow the buyer to have the electronic tickets delivered to an e-mail address associated with the buyer. The buyer may access the e-mail account, display the electronic tickets, and print out paper copies of the electronic tickets. Each of the paper copies of the electronic tickets may include a bar code which can be scanned at the event venue to allow access.

Alternatively or additionally, the buyer may instruct the network-based system 110 to send an electronic ticket to a mobile device (e.g., mobile phone or PDA) associated with the buyer. For example, the buyer may receive the electronic ticket at the mobile device and display a bar code of the electronic ticket on a screen of the mobile device which may be scanned at the event venue to grant access. In some usage scenarios, the buyer may receive an SMS message sent to a mobile device that includes a link to a web page to render a ticket. In other usage scenarios, the buyer may receive an MMS message sent to a mobile device that includes an image of the ticket. When the buyer chooses delivery to a mobile device, the buyer also may receive the ticket via e-mail as a backup in case the buyer wants to print out a paper copy to bring to or use at the event venue. The buyer may receive a text message at the time of ticket purchase and, if the tickets are purchased more than a predetermined time before the event (e.g., two days before the event), a reminder text message just before (e.g., one day prior to) the event.

In various embodiments, when the buyer purchases electronic tickets using a credit card, the buyer may access the venue by swiping the credit card used to make the purchase at the event venue. Alternatively or additionally, the buyer may use a driver's license to validate the ticket at the event venue. In some implementations, only the buyer may use the credit card used to make the purchase or a driver's license as a means of entry at the event venue. It can be appreciated that in such implementations, the buyer may validate his/her ticket at the venue as well as validate other purchased tickets for other people who are present with the buyer at the time of entry into the event venue.

In various embodiments, the network-based system 110 may provide the buyer with various delivery options for splitting the distribution of a single order of multiple electronic tickets among one or more recipients in addition to and/or other than the buyer as described in co-pending U.S. patent application Ser. No. 12/325,789 titled "System and Methods for Variable Distribution and Access Control for Purchased Event Tickets," which was filed on Dec. 1, 2009 and is incorporated by reference in its entirety. In such embodiments, a buyer may purchase multiple electronic tickets (e.g., block of four electronic tickets) at once in a single order and choose to variably distribute one or more of the purchased electronic tickets and/or the underlying rights associated with one or more of the purchased electronic tickets to different end recipients using different delivery mechanisms (e.g., e-mail, SMS message, MMS message, etc.), or other suitable delivery mechanism. Upon delivery, each electronic ticket may be used by the recipient independently of the buyer arriving at the event so that the entire party does not need to be present to enter the event venue.

User Interfaces

As described above, the network-based system 110 may communicate with users over one or more types of networks 108 via interfaces provided the communications servers 120 and provide various services to users such as online marketplace and ticket fulfillment services via the application servers 130 and databases 150. When servicing a user, the network-based system 110 may present information to and/or receive information from the user in a variety of ways such by displaying and receiving information via user interfaces (e.g., web pages, interactive screens), sending and receiving messages (e.g., e-mail, IM, SMS, MMS, video message), placing and/or receiving telephone calls (e.g., landline, mobile, VoIP, IVR calls), and so forth. User interfaces also may be displayed to a user via one or more client programs 106 such as a web client (e.g., web browser, desktop or mobile widget, web browser toolbar) and/or a third-party application 116.

Exemplary representations of user interfaces displayed on a computer for providing variable distribution and access control for purchased event tickets are described below with reference to FIGS. 2-5. It is to be understood that the embodiments are not limited to such exemplary representations. Furthermore, it is to be understood that while a particular user interface may be described as comprising a certain set of features and functions, a user interface may comprise fewer features and functions, additional features and functions, and/or a combination of various features and functions of different user interfaces in accordance with the described embodiments.

Figure 2:

FIG. 2 illustrates a representation of a user interface 200 in accordance with various embodiments. The user interface 200 may be provided in conjunction with the selling services of the network-based system 110, displayed by one or more of the client devices 104 (e.g., PC or mobile device), and presented via a web browser and/or a client-side web application. In various implementations, the user interface 200 may be provided, displayed, and presented after the seller has selected an event (e.g., specific game or performance), a delivery option (e.g., courier, electronic delivery), a selling option (e.g., declining price, fixed price, auction), and a ticket quantity. The embodiments, however, are not limited to this context or to this representation.

As shown, the user interface 200 comprises an interactive web page for allowing a seller user to enter ticket details. The user interface 200 includes a section field 202 for entering section information regarding the tickets for sale. The user interface 200 provides a "lookahead" section filter such that partial section information in the section field 202 is read as the seller types, and relevant sections are displayed to the seller in a drop down menu 204. The seller may then select the section from the menu 204 making the entering of ticket details easier for the seller and reducing the number of listings that go unmapped and therefore unsold.

FIG. 3 illustrates a representation of a user interface 300 in accordance with various embodiments. The user interface 300 may be provided in conjunction with the selling services of the network-based system 110, displayed by one or more of the client devices 104 (e.g., PC or mobile device), and presented via a web browser and/or a client-side web application. In various implementations, the user interface 300 may be provided, displayed, and presented after the seller has submitted the required seating and ticket details via the user interface 200. The embodiments, however, are not limited to this context or to this representation.

As shown, the user interface 300 comprises an interactive web page for allowing the seller to enter a payment method and a price per ticket. The user interface 300 includes a price field 302 for allowing the seller to enter a price per ticket and a compare prices icon 304. When the compare prices icon 304 is clicked, the seller is presented with an interactive event venue seat map in a separate window (e.g., DIV pop-up overlay) regardless of whether the seller has entered pricing information into the price field 302.

Figure 4:
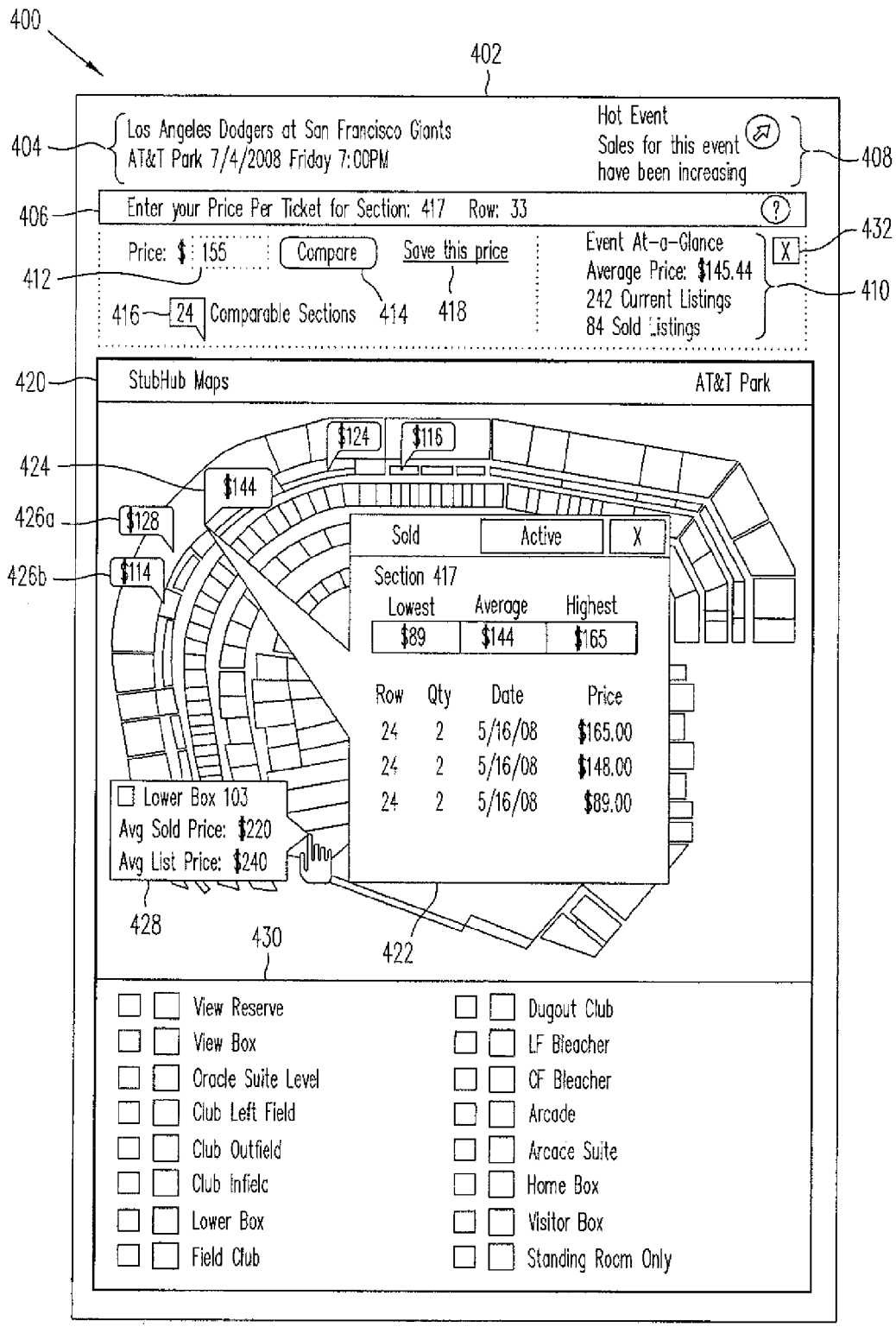

FIG. 4 illustrates a representation of a user interface 400 in accordance with various embodiments. The user interface 400 may be provided in conjunction with the selling services of the network-based system 110, displayed by one or more of the client devices 104 (e.g., PC or mobile device), and presented via a web browser and/or a client-side web application. In various implementations, the user interface 400 may be provided, displayed, and presented after the seller has clicked a compare prices icon (e.g., compare prices icon 304) and/or a link. The embodiments, however, are not limited to this context or to this representation.

As shown, the user interface 400 comprises an overlay 402 (e.g., DIV pop-up overlay) for providing sellers with the opportunity to view pricing details to allow for a more accurate picture of the current market value of their tickets.

The overlay 402 includes event information 404 (e.g., event name, venue, and date), ticket details 406 (e.g., section and row entered by the seller), pricing trend information 408 (e.g., rising or falling sales), and an event summary 410 (e.g., average price for the event, number of active listings, and number of sold listings).

The overlay 402 also includes a price input field 412 for entering and/or editing a price per ticket. If the user has previously entered initial pricing information within the price field 302 of the user interface 300, for example, the price input field 412 of the overlay 402 is pre-populated with the previously entered price. When pricing information (e.g., price per ticket) is included in the price input field 412 and a compare button 414 is clicked, the overlay 402 provides a ticket price comparison 416 showing the total number of comparable sections. In some cases, such as when price per ticket has been previously entered, the ticket price comparison 416 is automatically shown without the need to click the compare button 414. The overlay 402 also includes a save price function 418 implemented as a link, icon, button, and/or other suitable object for closing the overlay 402 and saving and/or updating the price of a ticket for a new or existing event listing.

The overlay 402 comprises an interactive event venue seat map 420 comprising a layout of the event venue indicating sections of an event venue for which tickets have been listed. The sections of the interactive event venue seat map 420 having available tickets are displayed in color while sections having no available tickets are displayed in white. Comparable or similarly-located (e.g., upper level) sections having available tickets are displayed in the same color corresponding to a zone for the aggregated sections.

In response to the ticket details (e.g., section and row entered by the seller), a sold/active pop-up window 422 is displayed that overlays a portion of the interactive event venue seat map 420 and that can be repositioned by dragging the sold/active pop-up window 422 within the interactive event venue seat map 420. As shown, the sold/active pop-up window 422 includes a sold tab, and active tab, and a "close" box. Initially, the name of the section entered by the seller is included in the sold/active pop-up window 422, and one of the sold tab and active tab is selected for presentation by default. If pricing information is available for the section and for the selected tab (e.g., sold tab or active tab), then the lowest (sold/active) price for the section, the average (sold/active) price for the section, the highest (sold/active) price for the section, and corresponding indicators are presented in the sold/active pop-up window 422. When pricing information is available for the section, a section marker 424 pointing to the section of the seller and indicating the average price for the section of the seller is also presented on the interactive event venue seat map 420. Otherwise, a message is presented in the sold/active pop-up window 422 indicating that there is no available pricing information for the section and requesting the seller to click on a comparable section.

When pricing information is available for the section, the sold/active pop-up window 422 also presents ticket details and transaction information for sold or active event listings. If the sold tab is selected, the ticket details include row and quantity, and the transaction information includes the sold date and price paid. If the active tab is selected, the ticket details include row and quantity, and the transaction information includes the listed price per ticket. When the seller clicks a different tab, pricing information, ticket details, and transaction information corresponding to the different tab is presented if available.

In response to the pricing information (e.g., price per ticket) entered by the seller, section markers (e.g., section marker 426a and section marker 426b) pointing to comparable sections that are within a predetermined range of the price per ticket entered by the seller and indicating the average price for tickets within each comparable section are presented. Such section makers show sections where the average sold price is close to the price that the seller is considering which helps the seller pinpoint sections to look at in more detail and may be displayed when seller clicks the compare button 416 or automatically when price per ticket has been previously entered by the seller.

The interactive event venue seat map 420 is configured to allow the seller to browse and click on sections to see sold and listed data for any section in the event venue. The seller also may zoom-in, zoom-out, drag, and/or rotate the interactive event venue seat map 420. When presented with the interactive event venue seat map 420, the seller may roll over (e.g., mouseover) a particular section causing a rollover screen (e.g., mouseover box 428) to appear that includes the section name, the average sold price for tickets in the section, and the average listed price for tickets in the section. If the particular section is clicked and pricing information is available for the zone, the sold/active pop-up 422 displays the section name and presents ticket details and transaction information for sold or active event listings within the section. As described above, the seller can click on the different tabs (e.g., sold tab and active tab) to display available pricing information, ticket details, and transaction information corresponding to the selected tab.

The interactive event venue seat map 420 also includes a zone legend 430 showing the different zone names and color codes corresponding to the zones. For zones that have available tickets, a box next to the zone name is displayed in the color corresponding to the zone. The interactive event venue seat map 420 provides a zone view that allows sellers to click on any zone name in the zone legend 430 to see all sold and listed data for that zone. When a zone name is selected, the color code of any section not in the selected zone is faded but still remains active for mouseover or click.

If a zone name is clicked and pricing information is available for the zone, the sold/active pop-up 422 displays the zone name and presents ticket details and transaction information for sold or active event listings within the zone. If the sold tab is selected, the ticket details include section, row, and quantity, and the transaction information includes the sold date and price paid. If the active tab is selected, the ticket details include section, row and quantity, and the transaction information includes the listed price per ticket. When the seller clicks a different tab, pricing information, ticket details, and transaction information corresponding to the different tab is presented if available.

It can be appreciated that interactive event venue seat map 420 provides sellers with the opportunity to view pricing details to allow for a more accurate picture of the current market value of their tickets. Displaying sold ticket prices serves as a highly valuable gauge for sellers, arming them with insight on the actual prices fans have been willing to pay for specific locations. Accordingly, sellers are better able to price their tickets based on the truest market value, resulting in a quicker sale. The "compare feature" of the interactive event venue seat map 420 also provides sellers with a quick visual indication whether a proposed sale price is within a sale price range determined from sold and current listing data of other similar listings. In some embodiments, the interactive event venue seat map 420 also may provide a visual warning to a seller when a proposed price is not competitive with respect to sold and current listing data of other similar listings.

After being presented with market value information, the seller may enter a different price per ticket in the price input field 412 and click on the compare button 414 to view an updated list of comparable sections and available pricing information. After finally deciding on a price per ticket, the seller can click on the save price function 418 or the close box 432 to close the overlay 402 to save and/or update the price of a ticket for a new or existing event listing.

FIG. 5 illustrates a representation of a user interface 500 in accordance with various embodiments. The user interface 500 may be provided in conjunction with the account and/or selling services of the network-based system 110, displayed by one or more of the client devices 104 (e.g., PC or mobile device), and presented via a web browser and/or a client-side web application. In various implementations, the user interface 300 may be provided, displayed, and presented within the account of the seller. The embodiments, however, are not limited to this context or to this representation.

As shown, the user interface 500 comprises an interactive web page for allowing the seller view active ticket listings. The user interface 500 includes an active event listing 502, a price field 504 for allowing the seller to view and edit a price per ticket for the active event listing 502, and a compare prices icon 506 associated with the active event listing 502. When the compare prices icon 506 is clicked, the seller is presented with an interactive event venue seat map in a separate window (e.g., DIV pop-up overlay). In various implementations, the price input field 412 of the overlay 402 is pre-populated with the price included in the price field 504, and the interactive event venue seat map 420 displays relevant and comparable pricing information based on the ticket information for the active event listing 502 and the price included in the price field 504.

FIG. 6 illustrates a logic flow 600 including operations performed by a computer in accordance with various embodiments. The logic flow 600 may be performed by various systems and/or devices and may be implemented as hardware, software, firmware, and/or any combination thereof, as desired for a given set of design parameters or performance constraints. For example, the logic flow 600 may be implemented by a logic device (e.g., computer and/or processor) and/or logic (e.g., computer executable program instructions) to be executed by a logic device.

As shown, the logic flow 600 may comprise providing one or more user interfaces for creating an event listing for a seller (block 610); receiving ticket details from the seller (block 620); obtaining available pricing information for the event based on sold prices and listed prices (block 630); and providing at least one user interface for presenting an interactive event venue seat map to display available pricing information for a section of the seller based on the sold prices and the listed prices (block 640).

In accordance with various embodiments, the interactive event venue seat map may comprise a layout of the event venue indicating sections of the event venue for which tickets are listed and a window overlaying a portion of the interactive event venue seat map that identifies the section of the seller and that is configured to display the available pricing information for the section of the seller based on sold prices for sold ticket listings and listed prices for active ticket listings.

It can be appreciated that while the logic flow 600 may illustrate a certain sequence of steps, other sequences of steps may also be performed in accordance with the described embodiments. Moreover, some individual steps of the logic flow 600 may include multiple sub-steps that may be performed in various sequences as appropriate to the individual step. Furthermore, additional steps may be added or some steps may be removed depending on the particular implementation.

In various embodiments, one or more operations of the logic flow 600 may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable programming language in accordance with the described embodiments.

In various embodiments, one or more operations of the logic flow 600 may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

Although some embodiments may be illustrated and described as comprising exemplary functional components or modules performing various operations, it can be appreciated that such components or modules may be implemented by one or more hardware components, software components, firmware components, and/or combination thereof.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

We claim:

1. A computer-implemented method comprising:
receiving ticket details for an event at an event venue for one or more tickets;
obtaining, by a network-based system, available pricing information for the event based on sold prices for sold ticket listings and listed prices for active ticket listings; and
providing, by the network-based system, at least one user interface of a graphical user interface (GUI) for a mobile application displayable through an output display of a mobile device that includes a compare prices feature that, when selected, presents an overlay including an interactive event venue seat map comprising:
a graphical interface layout of the GUI comprising the interactive event venue seat map of the event venue indicating sections of the event venue for which tickets are listed; and
a window of the graphical interface layout overlaying a portion of the interactive event venue seat map displayed through the output display of the mobile device that identifies a section where at least one of the tickets is being sold through a graphical interface identifier displayed on the graphical interface layout and that is configured to display available pricing information for seats in the section based on the sold prices for the sold ticket listings and the listed prices for active ticket listings, wherein the available pricing information in the window comprises an average price, a number of active listings, and a number of sold listings.

2. The computer-implemented method of claim 1, wherein the available pricing information for the section further includes a highest price, a lowest price, and an average price.

3. The computer-implemented method of claim 1, wherein:
the window is configured to provide ticket details and transaction information for the sold event listings and the active event listings;
the ticket details for the sold event listings include row and quantity, and the transaction information for the sold event listings includes the sold date and price paid; and
the ticket details for the active event listings include row and quantity, and the transaction information for the active event listings includes the listed price per ticket.

4. The computer-implemented method of claim 1, wherein the window comprises:
a sold tab for providing available pricing information based on the sold prices for the sold ticket listings; and
an active tab for providing available pricing information based on the listed prices for the active ticket listings.

5. The computer-implemented method of claim 1, wherein the window is configured to display available pricing information for another section selected by the seller from the interactive event venue seat map and to display available pricing information for a zone selected by the seller from the interactive event venue seat map.

6. The computer-implemented method of claim 1, wherein the interactive event venue seat map identifies comparable sections based on a price per ticket entered by the seller into at least one of the user interfaces and provides available pricing information for the comparable sections.

7. The computer-implemented method of claim 1, wherein the interactive event venue seat map is configured to present a mouse-over box in response to mouse-over of a particular section in the layout of the event venue, the mouse-over box displaying a name of the particular section, an average sold price for tickets in the particular section, and an average listed price for tickets in the particular section.

8. The computer-implemented method of claim 1, further comprising providing, by the network based system, one or more user interfaces to be displayed on a computing device of the seller for creating the event listing.

9. The computer-implemented method of claim 1, wherein the overlay provides pricing trend information based on one or more of change in the average price, change in the number of active listings, and change in the number of sold listings.

10. A non-transitory computer-readable storage medium having stored thereon machine-readable instructions executable to cause a machine to perform operations comprising:
receiving ticket details for an event at an event venue;
obtaining, by a network-based system, available pricing information for the event based on sold prices for sold ticket listings and listed prices for active ticket listings; and
providing, by the network-based system, at least one user interface of a graphical user interface (GUI) for a mobile application displayable through an output display of a mobile device that includes a compare prices feature that, when selected, presents an overlay including an interactive event venue seat map comprising:
a graphical interface layout of the GUI comprising the interactive event venue seat map of the event venue indicating sections of the event venue for which tickets are listed; and
a window of the graphical interface layout overlaying a portion of the interactive event venue seat map displayed through the output display of the mobile device that identifies a section where at least one of the tickets is being sold through a graphical interface identifier displayed on the graphical interface layout and that is configured to display available pricing information for seats in the section based on the sold prices for the sold ticket listings and the listed prices for active ticket listings, wherein the available pricing information in the window comprises an average price, a number of active listings, and a number of sold listings.

11. The non-transitory computer-readable storage medium of claim 10, wherein the available pricing information for the section of the seller further includes a highest price, a lowest price, and an average price.

12. The non-transitory computer-readable storage medium of claim 10, wherein:
the window is configured to provide ticket details and transaction information for the sold event listings and the active event listings;
the ticket details for the sold event listings include row and quantity, and the transaction information for the sold event listings includes the sold date and price paid; and
the ticket details for the active event listings include row and quantity, and the transaction information for the active event listings includes the listed price per ticket.

13. The computer-readable storage medium of claim 10, wherein the window comprises:
a sold tab for providing available pricing information based on the sold prices for the sold ticket listings; and
an active tab for providing available pricing information based on the listed prices for the active ticket listings.

14. The non-transitory computer-readable storage medium of claim 10, wherein the window is configured to display available pricing information for another section selected by the seller from the interactive event venue seat map and to display available pricing information for a zone selected by the seller from the interactive event venue seat map.

15. The non-transitory computer-readable storage medium of claim 10, wherein the interactive event venue seat map identifies comparable sections based on a price per ticket entered by the seller into at least one of the user interfaces and provides available pricing information for the comparable sections.

16. The non-transitory computer-readable storage medium of claim 10, wherein the interactive event venue seat map is configured to present a mouse over box in response to mouse over of a particular section in the layout of the event venue, the mouse over box displaying a name of the particular section, an average sold price for tickets in the particular section, and an average listed price for tickets in the particular section.

17. The non-transitory computer-readable storage medium of claim 10, wherein the instructions, when executed, cause a computer to further provide one or more user interfaces to be displayed on a computing device of the seller for creating the event listing.

18. The non-transitory computer-readable storage medium of claim 17, wherein the overlay provides pricing trend information based on one or more of change in the average price, change in the number of active listings, and change in the number of sold listings.

19. A network-based system comprising:
one or more servers configured to:
receive ticket details for an event at an event venue;
obtain, by a network-based system, available pricing information for the event based on sold prices for sold ticket listings and listed prices for active ticket listings; and
provide, by the network-based system, at least one user interface of a graphical user interface (GUI) for a mobile application displayable through an output display of a mobile device that includes a compare prices feature that, when selected, presents an overlay including an interactive event venue seat map comprising:
a graphical interface layout of the GUI comprising the interactive event venue seat map of the event venue indicating sections of the event venue for which tickets are listed; and
a window of the graphical interface layout overlaying a portion of the interactive event venue seat map displayed through the output display of the mobile device that identifies a section where at least one of the tickets is being sold through a graphical interface identifier displayed on the graphical interface layout and that is configured to display available pricing information for seats in the section based on the sold prices for the sold ticket listings and the listed prices for active ticket listings, wherein the available pricing information in the window comprises an average price, a number of active listings, and a number of sold listings.

20. The network-based system of claim 19, wherein the one or more servers are further configured to provide access from an account of the seller to an interactive event venue seat map for one or more active event listings of the seller.

21. The network-based system of claim 19, wherein the one or more servers are further configured to provide one or more user interfaces to be displayed on a computing device of the seller for creating the event listing.

* * * * *